United States Patent
Hong et al.

(10) Patent No.: US 11,522,878 B2
(45) Date of Patent: Dec. 6, 2022

(54) CAN COMMUNICATION BASED HACKING ATTACK DETECTION METHOD AND SYSTEM

(71) Applicant: FESCARO CO., LTD., Ulsan (KR)

(72) Inventors: Seok Min Hong, Daejeon (KR); Hyun Jeong Lee, Namyangju-si (KR)

(73) Assignee: FESCARO CO., LTD., Ulsan (KR)

( * ) Notice: Subject to any disclaimer, the term of this patent is extended or adjusted under 35 U.S.C. 154(b) by 402 days.

(21) Appl. No.: 16/715,437

(22) Filed: Dec. 16, 2019

(65) Prior Publication Data

US 2020/0120117 A1 Apr. 16, 2020

Related U.S. Application Data

(63) Continuation of application No. PCT/KR2018/006756, filed on Jun. 15, 2018.

(30) Foreign Application Priority Data

Jun. 16, 2017 (KR) .......... 10-2017-0076811
Jun. 30, 2017 (KR) .......... 10-2017-0083610

(51) Int. Cl.
*H04L 29/06* (2006.01)
*H04L 9/40* (2022.01)
*H04L 12/40* (2006.01)

(52) U.S. Cl.
CPC .......... *H04L 63/1416* (2013.01); *H04L 12/40* (2013.01); *H04L 63/0254* (2013.01);
(Continued)

(58) Field of Classification Search
CPC .. H04L 63/0254; H04L 63/1416; H04L 12/40
See application file for complete search history.

(56) References Cited

U.S. PATENT DOCUMENTS

2005/0066062 A1    3/2005  Hartwich
2015/0358351 A1   12/2015  Otsuka et al.
(Continued)

FOREIGN PATENT DOCUMENTS

JP    2013-168865 A    8/2013
JP    5609363 B2      11/2014
(Continued)

OTHER PUBLICATIONS

National Instruments Corporation; CAN, Automotive Diagnostic Command Set User Manual; Dec. 2009. 336 pages.
(Continued)

*Primary Examiner* — Jeffrey C Pwu
*Assistant Examiner* — Thong P Truong
(74) *Attorney, Agent, or Firm* — Burris Law, PLLC

(57) ABSTRACT

Provided is a CAN communication based abnormal message detection method including obtaining reception times of reception messages; a reception filtering operation for performing a period calculation for comparing a difference between reception times of reception messages having the same message ID and a reference period of the corresponding message ID; an abnormal message detecting operation for determining the reception messages as abnormal messages when, as a result of the period calculation, the difference between the reception times is smaller than the reference period and determining the reception messages as normal messages when the difference between the reception times is greater than the reference period; and a blocking operation for blocking the abnormal messages.

10 Claims, 19 Drawing Sheets

(52) U.S. Cl.
CPC ............... *H04L 2012/40215* (2013.01); *H04L 2012/40273* (2013.01)

(56) References Cited

U.S. PATENT DOCUMENTS

2016/0173530 A1* 6/2016 Miyake .................. H04L 63/20
          726/3
2018/0048663 A1* 2/2018 Yura ....................... H04L 12/40

FOREIGN PATENT DOCUMENTS

| JP | 2017-085663 A | 5/2017 |
| JP | 2017-114406 A | 6/2017 |
| KR | 10-1472896 B1 | 12/2014 |
| KR | 10-1714520 B1 | 3/2017 |

OTHER PUBLICATIONS

PCT International Search Report and Written Opinion for PCT Application No. PCT/KR2018/006756 dated Sep. 20, 2018, 19 pages.

\* cited by examiner

CAN COMMUNICATION BASED HACKING ATTACK DETECTION METHOD AND SYSTEM

CROSS-REFERENCE TO RELATED APPLICATIONS

The present application is a continuation of PCT Application No. PCT/KR2018/006756, filed Jun. 15, 2018, which claims priority to Korean Patent Application No. 10-2017-0076811, filed Jun. 16, 2017, and to Korean Patent Application No. 10-2017-0083610, filed Jun. 30, 2017, the disclosures of which are hereby incorporated in their entirety by reference as set forth herein.

TECHNICAL FIELD

The disclosure relates to a CAN communication based hacking attack detection method and system for detecting abnormal messages by comparing reception periods of reception messages with a reference period by using reception time information regarding the reception message transmitted through a CAN bus.

The disclosure also relates to a CAN communication based bypass attack detection method and system, and more particularly, a CAN communication based bypass attack detection method and system for monitoring that an ECU for detection is in a message transmission incapacitated state due to a hacking attack and, when a CAN message corresponding to the ECU for detection is received despite of the message transmission incapacitated state, determining the corresponding CAN message as an abnormal CAN message.

BACKGROUND ART

In general, with the rapid development of electronic control technology, various devices in automobiles that were operated by mechanical methods are now driven by electrical methods for reasons including driver convenience and driving safety, and system for automobiles is being advanced more and more. In particular, as a vehicle system is fully automated, communications between electronic controllers (ECUs) in a vehicle are also frequently performed. A controller area network (CAN) communication is commonly used for in-vehicle communication.

In other words, an electronic control system inside a vehicle includes dozens of ECUs, e.g., an engine controller, a transmission controller, a brake controller, an airbag controller, etc. Also, each ECU includes a CAN controller for CAN communication, and communications between these ECUs use CAN communication.

Basically, according to a message communication based on a CAN protocol, a network includes a plurality of nodes (or CAN controllers) and a common CAN bus, wherein each node transmits a message by broadcasting, and each node selects and receives messages as needed. In other words, all CAN controllers (or nodes) transmit and receive messages by using the CAN bus in common. Also, each CAN controller (or node) transmits messages to all nodes on the network through broadcasting. Also, a self-arbitration function by using message identifiers is provided. In detail, each node or CAN controller identifies an identifier of a message and receives only necessary messages from among broadcasted messages. In other words, in CAN communication, there is no field in the data frame of a message for authenticating the destination of the message.

However, as described above, CAN communication has a security risk inherent in the CAN protocol, because data is transmitted and received by using only a broadcasting technique and message identifiers.

For example, since messages are transmitted through broadcasting in a CAN communication, when a malicious node is added to a CAN communication network, the malicious node is capable of collecting all messages transmitted by other nodes. The malicious node is also capable of generating a fake message by using collected information and transmits the fake message to the CAN communication network. Since there is no separate field for authenticating a transmission destination in the data frame of a CAN communication message, such a spoofing attack may be easily made.

Also, a denial of service attack may be easily made by exploiting the arbitration function using CAN message identifiers. The arbitration function using identifiers refers to a function which gives priority to each identifier and transmits messages with priorities preferentially. First, an attacker (or a malicious node) collects messages on a CAN communication network and finds out an identifier (ID) with the highest priority. The attacker then generates a fake message by using the ID and continuously transmits the fake message over the network. Since the fake message generated by the attacker has a high priority, no other normal message may be transmitted due to the arbitration function using CAN message identifiers. When such condition persists, only the attacker's message remains on the CAN communication network, resulting in a denial of service situation that prevents other normal messages from being delivered.

In particular, in a conventional vehicle electronic control system using a CAN communication, devices with high security vulnerabilities and security-critical devices are connected to the same CAN bus. Therefore, when device with high security vulnerability due to high external network connectivity (e.g., telematics, AVN system, etc.) are taken over by hackers, security-critical devices (e.g., an engine controller, a brake controller, an airbag controllers, etc.) may be stolen, and thus serious security threat to a vehicle system may occur.

To solve the above problems, a technique for exchanging encryption keys and transmitting and receiving messages encrypted only within a mutually shared time window has been proposed [Patent Document 1]. Also, a technique for generating a secret key stream and transmitting and receiving a message encrypted in a symmetric key manner has also been proposed [Patent Documents 2 and 3]. Also, a technique utilizing an one-time password (OTP) ROM for generating an encryption key has been proposed (Patent Document 4). A technique for determining whether a message is a hacking message by using the periodicity of messages in a CAN communication has been proposed [Patent Document 5].

However, since a message is transmitted and received after being encrypted in the prior arts, it is necessary to perform a calculation for encryption or decryption. Also, it is necessary to generate or exchange an encryption key or a secret key for encrypted communication. Since an operation time is needed for such an encryption operation, there is a problem that message transmission and reception time may be delayed.

DESCRIPTION OF EMBODIMENTS

Technical Problem

The disclosure is to solve the above problems and provides a CAN communication based hacking attack detection method and system capable of detecting whether received messages are abnormal messages by using a period operation for comparing a difference between reception times of reception messages having the same message ID with a reference period.

The disclosure also provides a CAN communication based hacking attack detection method and system for filtering messages received from a CAN bus to receive only messages having valid reception IDs.

The disclosure also provides a CAN communication based hacking attack detection method and system for filtering messages to be transmitted to a CAN bus to transmit only messages having valid transmission IDs.

The disclosure also provides to real-time monitoring an ECU that entered into the idle state, that is, the message transmission incapacitated state due to a hacking attack.

The disclosure also provides, when a CAN message corresponding to an ECU that entered into the message transmission incapacitated state due to a hacking attack is received, determination of the CAN message as an abnormal message.

The disclosure also provides monitoring an ECU targeted for a bypass attack by using an international standard related to a diagnostic-CAN.

Solution To Problem

According to an aspect of the disclosure, there is provided a CAN communication based abnormal message detection method including obtaining reception times of reception messages; a reception filtering operation for performing a period calculation for comparing a difference between reception times of reception messages having the same message ID and a reference period of the corresponding message ID; an abnormal message detecting operation for determining the reception messages as abnormal messages when, as a result of the period calculation, the difference between the reception times is smaller than the reference period and determining the reception messages as normal messages when the difference between the reception times is greater than the reference period; and a blocking operation for blocking the abnormal messages.

In the obtaining of the reception times of the reception messages, reception times of the reception messages measured as a microcontroller generates an interrupt signal may be obtained or reception times of the reception messages that a CAN controller measured by using an internal module may be obtained.

In the reception filtering operation, a difference between reception times of at least three most recently received reception messages having the same message ID is compared with a period of the corresponding message ID, and, when the difference between a first reception time and a third reception time from among the at least three most recently received reception messages is smaller than a reference period of the corresponding message ID, at least one reception message from among the at least three most recently reception messages may be determined as an abnormal message.

A detection score learner configured to correct a detection score by using a result of the period calculation may be provided, the detection score learner may perform the period calculation every time a message is received, and, as a result of the period calculation, the detection score may be increased by a pre-set value when the difference between the reception times is smaller than the reference period and the detection score may be decreased by a pre-set value when the difference between the reception times is greater than the reference period, and, in the blocking operation, the reception message may be determined as an abnormal message when the detection score is equal to or greater than a certain value.

At least one of a reference period and a learned detection score of the message ID may be stored in a protected memory, and the protected memory is a non-volatile memory, such as a read only memory (ROM) or a flash memory.

According to another aspect of the disclosure, there is provided a computer program recorded on a computer readable recording medium to implement the method.

According to another aspect of the disclosure, there is provided a CAN communication based abnormal message detection system including a CAN controller and a microprocessor, the system including a reception time measuring unit configured to obtain reception times of reception messages; a reception filter configured to perform a period calculation for comparing a difference between reception times of reception messages having the same message ID and a reference period of the corresponding message ID; and an abnormal message detector configured to determine the reception messages as abnormal messages when, as a result of the period calculation, the difference between the reception times is smaller than the reference period and determine the reception messages as normal messages when the difference between the reception times is greater than the reference period.

According to another aspect of the disclosure, there is provided a CAN communication based bypass attack detection method including a CAN ID obtaining operation for obtaining CAN IDs from one or more CAN messages received from a CAN bus and generating a CAN ID list; a diagnostic-CAN ID extracting operation for extracting a diagnostic-CAN CAN ID corresponding to a request or a response related to a diagnostic-CAN from among the CAN IDs; a matching operation for matching a corresponding ECU for detection to the diagnostic-CAN CAN ID; an ECU state monitoring operation for determining whether a state of the ECU for detection is a normal message transmission state or a message transmission incapacitated state; and an abnormal message determining operation for determining CAN messages corresponding to the ECU for detection as abnormal messages when the ECU for detection is in the message transmission incapacitated state and CAN messages corresponding to the ECU for detection are periodically received.

The ECU status monitoring operation may include a reprogramming detecting operation for detecting that the ECU for detection enters a reprogramming mode and is in the message transmission incapacitated state; and a temporary incapacity detecting operation for detecting that the ECU for detection is temporarily in the message transmission incapacitated state.

In the reprogramming detecting operation, it may be determined that the ECU for detection entered the reprogramming mode and is in the message transmission incapacitated state based on detection of a reprogramming-related ECU reset request with respect to the ECU for detection.

In the temporary incapacity detecting operation, when message transmission disabling requests for the ECU for detection exist at a pre-set time interval or less, it may be determined that the ECU for detection is temporarily in the message transmission incapacitated state.

The method further includes a detection score learning operation for increasing a detection score by a pre-set value when CAN message corresponding to the ECU for detection is received and decreasing the detection score by a pre-set value when a CAN message corresponding to the ECU for detection is not received within a pre-set time, when the ECU for detection is in the message transmission incapacitated state, wherein, in the abnormal message determining operation, when the detection score is equal to or greater than a reference value, a CAN message corresponding to the ECU for detection may be determined as an abnormal message.

The state of the ECU for detection may be stored in a non-volatile memory.

According to another aspect of the disclosure, there is provided a CAN communication based bypass attack detection system including a CAN ID obtainer configured to obtain CAN IDs from one or more CAN messages received from a CAN bus and generating a CAN ID list; a diagnostic-CAN ID extractor configured to extract a diagnostic-CAN CAN ID corresponding to a request or a response related to a diagnostic-CAN from among the CAN IDs; a matching unit configured to match a corresponding ECU for detection to the diagnostic-CAN CAN ID; an ECU state monitoring unit configured to determine whether a state of the ECU for detection is a normal message transmission state or a message transmission incapacitated state; and an abnormal message detector configured to determine CAN messages corresponding to the ECU for detection as abnormal messages when the ECU for detection is in the message transmission incapacitated state and CAN messages corresponding to the ECU for detection are periodically received.

According to another aspect of the disclosure, there is provided a computer program recorded on a computer readable recording medium to implement the method.

Advantageous Effects of Disclosure

As described above, according to a CAN communication based hacking attack detection method and system according to the disclosure, abnormal messages (hacking attack messages, malicious messages, etc.) from among CAN messages received from a CAN bus by electric control units (ECUs) connected to a vehicle CAN bus may be detected or blocked.

Also, according to a CAN communication based hacking attack detection method and system according to the disclosure, an ECU of which control is taken by a hacker may be prevented from being abused as a hacking attach tool for transmitting an attack (abnormal) message to a vehicle CAN bus. In particular, not only known attack techniques, but also unknown types of attack messages may be detected or blocked.

Also, according to a CAN communication based hacking attack detection method and system according to the disclosure, by directly providing a detection and blocking system in an ECU connected to a CAN bus, a secure CAN communication environment embedded in the form of a semiconductor may be provided, thereby complying with the international standard of a vehicle communication standard. Therefore, the disclosure may be applied to the existing vehicle internal networks without modification.

Also, according to a CAN communication based hacking attack detection method and system according to the disclosure, a transmission message or a reception message may be filtered by a processor that is connected to or embedded in an ECU connected to a CAN bus to control the ECU.

Also, according to a CAN communication based bypass attack detection method and system according to the disclosure, an ECU that entered the idle state due to a hacking attack may be monitored in real time.

According to the disclosure, when a CAN message corresponding to an ECU that entered into the message transmission incapacitated state due to a hacking attack is received, the CAN message may be determined as an abnormal message.

According to the disclosure, an ECU that entered the message transmission incapacitated state due to a hacker's attack may be detected without using a complicated security algorithm by using an international standard related to a diagnostic-CAN.

MODE OF DISCLOSURE

Figure 1:
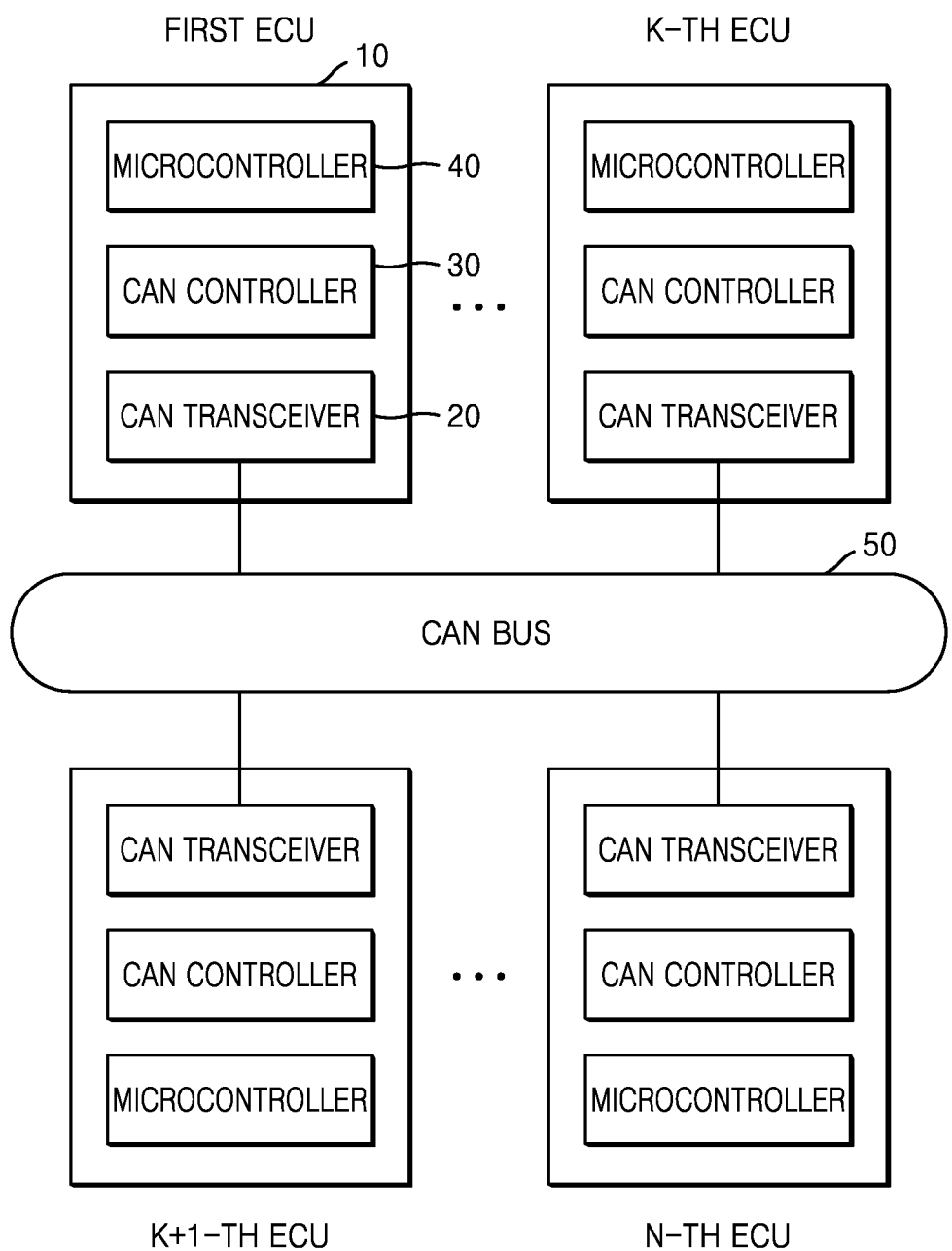
FIG. 1 is a block diagram showing the configuration of a CAN communication according to an embodiment of the disclosure.

The detailed description of the disclosure below refers to the accompanying drawings that show, by way of illustration, specific embodiments in which the disclosure may be practiced. These embodiments are described in sufficient detail to enable those skilled in the art to practice the disclosure. It is to be understood that the various embodiments of the disclosure are different but need not be mutually exclusive. For example, certain shapes, structures, and characteristics described herein may be implemented with changes from one embodiment to another without departing from the spirit and scope of the disclosure. Also, it is to be understood that the location or arrangement of individual components within each embodiment may be changed without departing from the spirit and scope of the disclosure. Accordingly, the following detailed description is not to be taken in a limiting sense, and the scope of the disclosure should be taken as encompassing the scope of the claims of the claims and all equivalents thereto. Like reference numerals in the drawings denote the same or similar elements throughout the several aspects.

First, FIG. 1 is a block diagram showing the configuration of a CAN communication according to an embodiment of the disclosure, and an overall system configuration for implementing the disclosure will be described with reference to FIG. 1.

As shown in FIG. 1, the entire system for implementing the disclosure includes a CAN bus 50, which is a component of a CAN communication for transmitting and receiving data, and a plurality of electronic control units (ECU) 10 connected to the CAN bus 50. At this time, a CAN communication of the disclosure may be applied not only to a common CAN communication, but also to an extended CAN and a CAN with flexible data-rate (CAN-FD).

The CAN bus 50 is a communication line for data transmission and may include a twisted pair wire. Here, two wires constituting the twisted pair wire are driven by different signals CAN_H and CAN_L, respectively. Transmission rate on the CAN bus 50 may vary depending on the length of the bus.

Also, the CAN bus 50 is divided into a transmission line Tx and a reception line Rx, and each ECU 10 transmits a message through the transmission line Tx and receives a message through the reception line (Rx). In particular, all the ECUs 10 are connected to common transceiver line (Tx, Rx) of the CAN bus 50 to transmit and receive messages.

The plurality of ECUs 10 or first to N-th ECUs 10 may be connected to the CAN bus 50 via a predetermined CAN connector, wherein, theoretically, the maximum number of ECUs that may be connected to one CAN communication is 2032.

The ECUs 10 may be classified into ECUs that are connected to external communication networks like smartphones, the internet, and traffic information systems and are directly exposed to security risks and ECUs that are not directly connected to an external communication network and are relatively safe.

The former ECUs 10 are multimedia CAN and are ECUs related to telematics, navigation, etc. These ECUs are connected to external communication networks, such as smartphones, the internet, and traffic information systems, and perform data communication. Therefore, the ECUs 10 are ECUs accessible from an external terminal or system.

On the other hand, the latter ECUs are mainly typical ECUs known in the art and are ECUs for controlling the internal system of a vehicle. For example, the latter ECUs include ECUs related to power trains like engines and transmissions; ECUs related to the chassis, such as a brake, a steering, and airbags; and ECUs related to the body, such as clusters, doors, and windows. Commonly, these are also referred to as a P-CAN, a C-CAN, and a B-CAN, respectively.

On the other hand, each ECU 10 includes a CAN transceiver 20, a CAN controller 30, and a microcontroller 40 (e.g. CPU). The CAN transceiver 20 is connected to the CAN bus 50 through a predetermined CAN connector and constitutes a physical layer of an ECU. The CAN transceiver 20 may provide a function of detecting and managing a failure of the CAN bus 50 and a function of transmitting and receiving a message.

The CAN controller 30 transmits and receives a CAN protocol message and performs a message filtering function on a received message. Also, the CAN controller 30 provides a message buffer for re-transmission control and an interface function with the microcontroller 40.

Figure 2A:
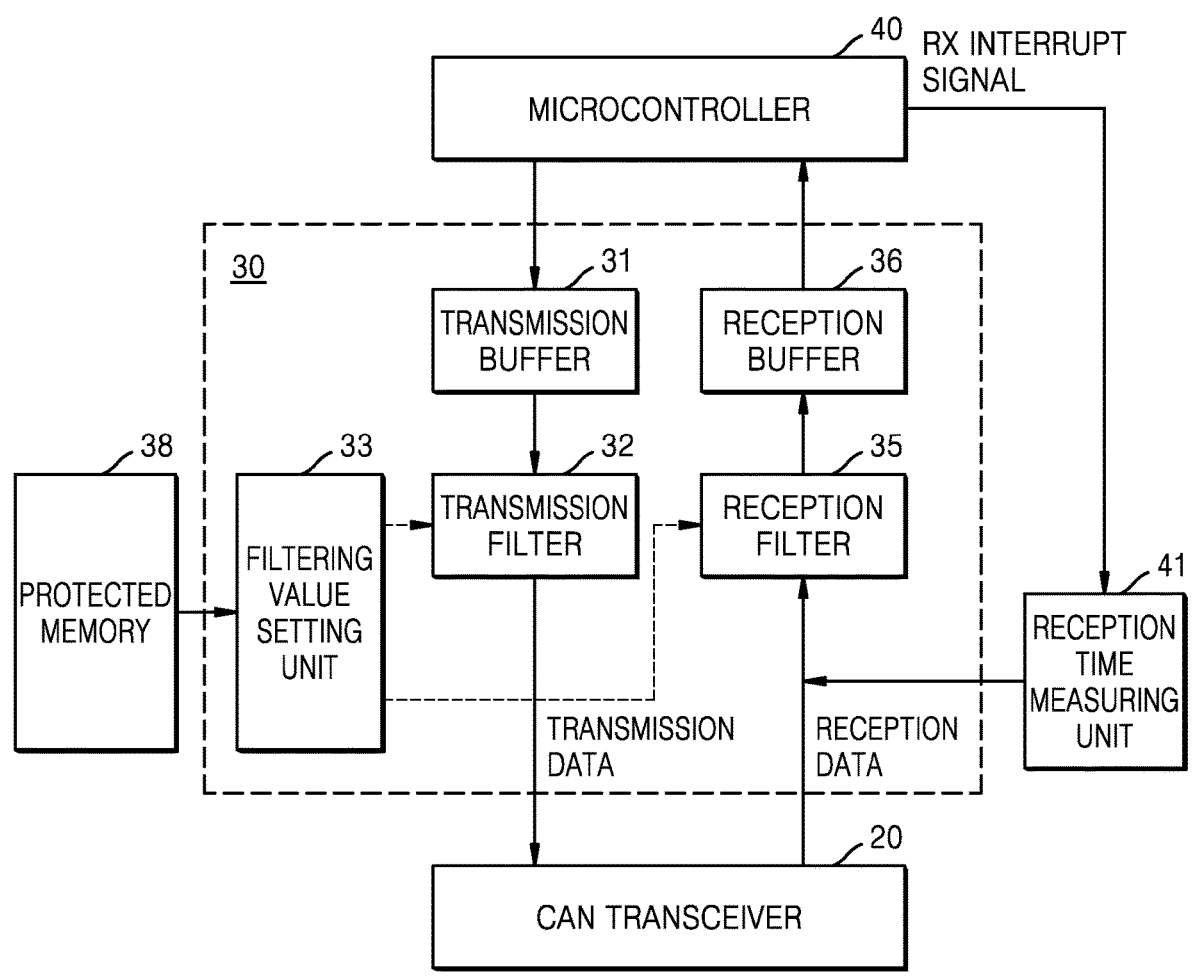
FIGS. 2A and 2B are block diagrams showing the configurations of a CAN controller according to an embodiment of the disclosure.
Figure 2B:
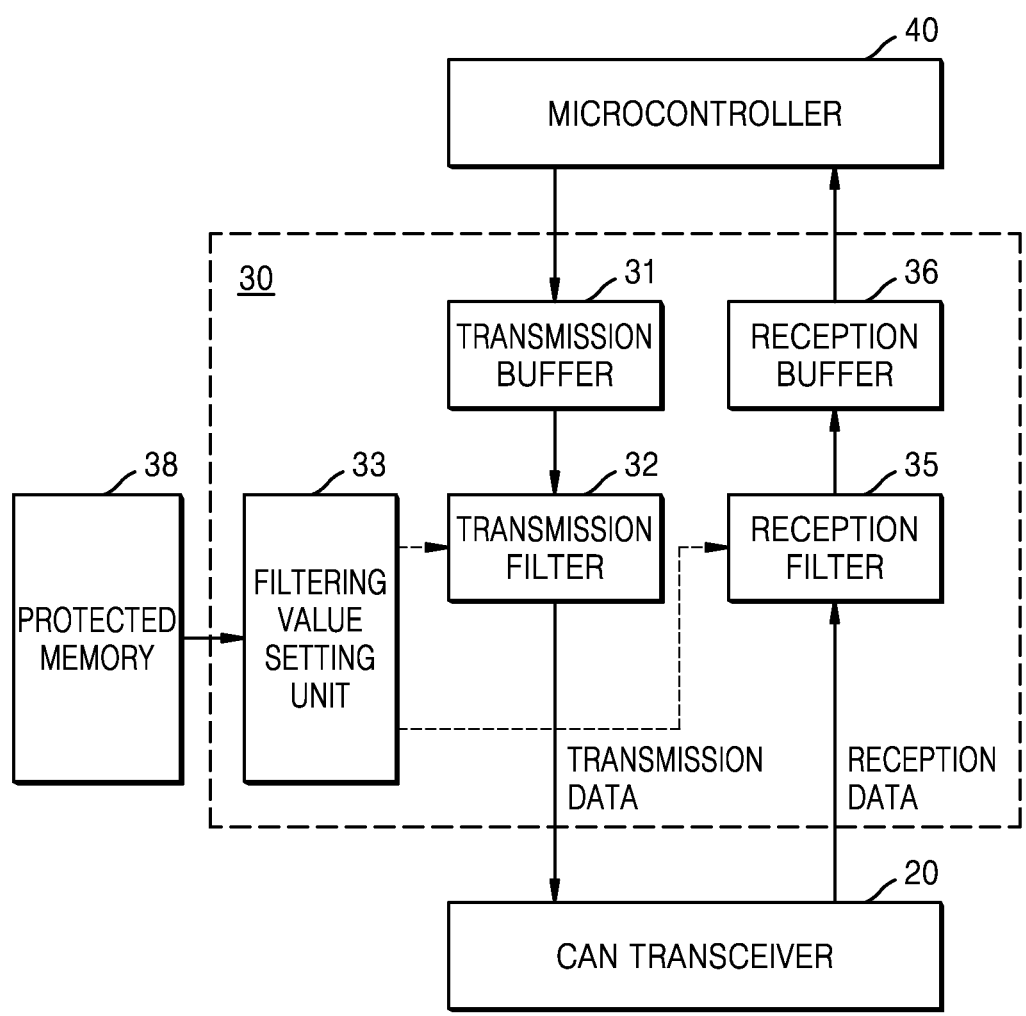

The microcontroller 40 may be equipped with a CPU, provide a higher layer protocol, and provide various applications.FIGS. 2A and 2B are block diagrams showing internal configurations of the CAN controller 30 according to an embodiment of the disclosure.

FIGS. 2A and 2B are both diagrams showing the internal configuration of the CAN controller 30, and the only difference therebetween is the configurations for measuring reception messages. Therefore, repeated descriptions in the description of FIGS. 2A and 2B will be omitted.

As shown in FIG. 2A, the CAN controller 30 according to the disclosure includes a transmission buffer 31 for temporarily storing data to transmit, a transmission filter 32 for filtering transmission data, a filtering value setting unit 33 for setting a filtering value, a reception filter 35 for filtering a reception message, and a reception buffer 36 for temporarily storing the reception message. Also, the CAN controller 30 further includes a protected memory 38 for storing a filtering value.

According to an embodiment of the disclosure, in case of detecting a reception message from a CAN bus, the microcontroller 40 may generate an Rx (receive) interrupt message. A reception time measuring unit 41 that received the Rx interrupt message may measure a reception time of the reception message based on an internal timer or clock information and transmit a measured reception time to the reception filter 35. Although FIG. 2A shows that the reception time measuring unit 41 is a component outside the microcontroller 40 for convenience of explanation, the reception time measuring unit 41 may be a component included in the microcontroller 40.

The transmission buffer 31 includes a buffer and temporarily stores data to transmit in the buffer. In particular, the microcontroller 40 stores data to transmit (or transmission data) in the buffer of the transmission buffer 31.

Figure 3:
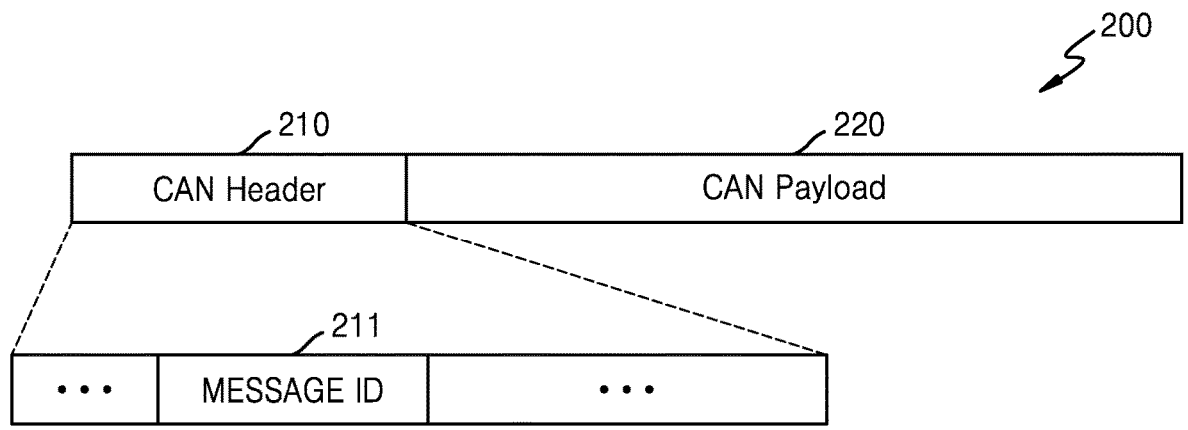
FIG. 3 is a block diagram of a transmission message and a reception message of a CAN message according to an embodiment of the disclosure.

FIG. 3 is a diagram for describing a structure of transmission data according to an embodiment of the disclosure.

As shown in FIG. 3, the transmission data includes a CAN header 210 part and a CAN payload 220 which corresponds to a data frame. Information to be transmitted is recorded in the CAN payload 220. For example, in the case of an engine ECU 10, data including a current state of an engine is recorded in the CAN payload 220. The standard of such a message complies with the standard defined by the CAN protocol.

Also, there is a message ID 211 field in the CAN header 210 of transmission data, and the ID of a corresponding message is recorded in the message ID 211 field. A message ID is an identifier of a message and indicates a type of the message. For example, messages transmitting RPMs of an engine are periodically transmitted, where RPM transmission messages have the same message ID. In other words, the ECU 10 receiving messages determines data of a corresponding message based on the message ID thereof.

As described above, the transmission buffer 31 sequentially stores transmission data including the CAN header 210 and the CAN payload 220 in a buffer, stores the transmission data in the order received by the microcontroller 40, and then transmits the transmission data through the CAN transceiver 20 in the order received.

Next, the transmission filter 32 filters the message ID 211 in the transmission data to transmit only transmission data having the message ID included in a filtering value. In other words, the transmission filter 32 holds a white list for message IDs that are allowed to transmit and transmits only transmission data having message IDs in the white list.

In other words, the transmission filter 32 filters the message ID of the transmission data based on the white list.

Next, the filtering value setting unit 33 sets filtering values for the transmission filter 32, that is, a white list. Modes to set filtering values include two modes, a protect function mode and an administrator mode (or a test mode).

In the administrator mode, the filtering value setting unit 33 sets a filtering value or a white list according to a direct instruction from the microcontroller 40. In other words, the filtering value setting unit 33 receives a list of allowed message IDs (or white list) from the microcontroller 40 and sets reception message IDs as filtering values for the transmission filter 32.

In the protect function mode, the filtering value setting unit 33 retrieves a message ID list or a white list stored in the protected memory 38 and sets filtering values for the transmission filter 32. When the CAN controller 30 is first powered on (or booted), the filtering value setting unit 33 retrieves a white list stored in the protected memory 38 and sets values of the white list as filtering values. Also, once filtering values are initially set, the filtering value setting unit 33 does not change the filtering values during operation, by a command from the microcontroller 40 or the like.

Therefore, since the filtering values are retrieved from the protected memory 38 and set only when the CAN controller 30 is initially driven, the filtering values are not changed even when the ECU 10 is hacked by a malicious attacker in the middle of operation.

Also, the filtering value setting unit 33 may set filtering values for the reception filter 35, that is, a white list. The white list for the transmission filter 32 stated above will be referred to as a first white list, and the white list for the reception filter 35 will be referred to as a second white list. The second white list, like the first white list, includes a list of message IDs that are allowed to be received.

The filtering value setting unit 33 retrieves the second white list from the protected memory 38 or the microcontroller 40 and sets values of the second white list as filtering values for the reception filter 35. Also, in the protect function mode, the filtering values of the reception filter 35 are initially set once and are not changed in the middle of operation.

Also, the filtering value setting unit 33 sets a reference period for each reception message ID as a period of a reception time table of the reception filter 35. The reference period set at this time is a period in which a message corresponding to each message ID is transmitted. When messages are transmitted by a sender having an appropriate authority, reception messages may be received at the interval of the reference period. The reference period may be initially set once, may not be changed in the middle of operation, and the filtering value setting unit 33 may obtain reference periods corresponding to respective message IDs from the protected memory 38.

Next, the protected memory 38 is a non-volatile memory, such as a read only memory (ROM) or a flash memory, and stores filtering values or a list of message IDs.

The protected memory 38 is a memory that is only allowed to be read for the filtering value setting unit 33. In other words, the filtering value setting unit 33 or the microcontroller 40 is unable to directly access the protected memory 38 and change or delete data thereof.

The protected memory 38 may include a normal non-volatile memory and a portion of the memory space thereof may be designated as a protected region. In this case, only data stored in the protected region is allowed to be read, and data may be changed or deleted in regions other than the protected region.

The protected memory or a protected memory region (protected region) is not accessible by memory address values like an ordinary non-volatile memory (e.g., a flash memory), and a special accessing method and a password are needed to access the protected memory region to read/write data therefrom/thereto.

The following information is stored in a protected memory or a protected region. In other words, valid message IDs to be transmitted, that is, a first white list is stored. In other words, message IDs included in the first white list are valid CAN IDs that may be transmitted to the CAN bus 50 in an electronic ECU to which a "secure CAN controller (or protect function mode)" is applied.

Also, the second white list is a set of valid CAN IDs that may be received from the CAN bus 50 in the electronic ECU 10 to which the "secure CAN controller (or protect function mode)" is applied.

Also, the protected memory 38 may also record reference periods and information regarding learned detection scores described below for respective CAN IDs for reception.

Next, the reception time measuring unit 41 measures a reception time of data (hereinafter, referred to as a reception message or a reception data) received from the CAN transceiver 20. In the embodiment of FIG. 2A, the reception time measuring unit 41 may receive an Rx interrupt signal generated by the microcontroller 40 and measure a reception time of a reception message. At this time, the reception time measuring unit 41 may measure a reception time based on an internal timer of the microcontrolle 40 or a clock signal and transmit a measured reception time to the reception filter 35.

Next, the reception filter 35 filters the message IDs of reception messages and transmits only reception message having the allowed message IDs to the reception buffer 36 to buffer. In detail, the reception filter 35 filters the message IDs 211 in reception messages and allows to receive only reception messages having message IDs included in filtering values. In other words, the reception filter 35 holds the second white list for message IDs that are allowed to be received and receives only reception messages having message IDs in the second white list. In other words, the reception filter 35 filters message IDs of reception messages based on the second white list.

Also, the reception filter 35 determines whether a message is an abnormal message by performing a period calculation for comparing differences between reception messages having the same message ID and a reference period of the corresponding message ID and transmits only normal messages to the reception buffer 36 to buffer. In detail, the reception filter 35 records reception times inserted in reception messages in a reception time table for each message ID. Reception times of at least three reception messages consecutively received may all be recorded, and differences between the recorded reception times of the reception messages may be compared with a reference period to determine whether the messages are normal messages. At this time, three consecutive reception times are reception times of reception messages having the same message ID.

The reception period of reception messages described herein may not necessarily be a time interval between reception messages directly adjacent to each other. For example, a difference between reception times of reception messages of the disclosure may be a difference between a first reception time and a third reception time from among three consecutive reception times. In detail, the reception filter 35 determines at least one of the at least three received reception messages is an abnormal message when the difference between the first reception time and the third reception time from among three consecutive reception times is smaller than the reference period.

A detailed configuration in which the reception filter 35 detects an abnormal message through ID filtering or reception time period analysis will be described below in detail with reference to FIGS. 6A and 6B.

Next, the reception buffer 36 stores reception messages in the reception buffer 36. Only reception messages filtered by the reception filter 35 are stored in the reception buffer 36. The reception messages stored in the reception buffer 36 are transmitted to the microcontroller 40.

Meanwhile, FIG. 2B shows a configuration of the ECU 10 when the CAN controller 30 measures reception times of reception messages by itself.

Unlike the embodiment of FIG. 2A in which reception times of reception messages are measured by an RX interrupt signal of the microcontroller 40, in the embodiment of FIG. 2B, reception times of reception messages are directly measured by the CAN controller 30, and thus the reception time measuring unit 41 of FIG. 2A may be omitted. Instead, in the embodiment of FIG. 2B, a component for measuring reception times of reception messages may be separately provided inside the CAN controller 30. This will be described below in more detail with reference to FIG. 6A.

Also, other than the measurement of reception times of reception messages by the CAN controller 30 itself, the configuration of the embodiment of FIG. 2B is the same as that of the embodiment of FIG. 2A, and thus description of overlapping configurations will be omitted.

Figure 4:
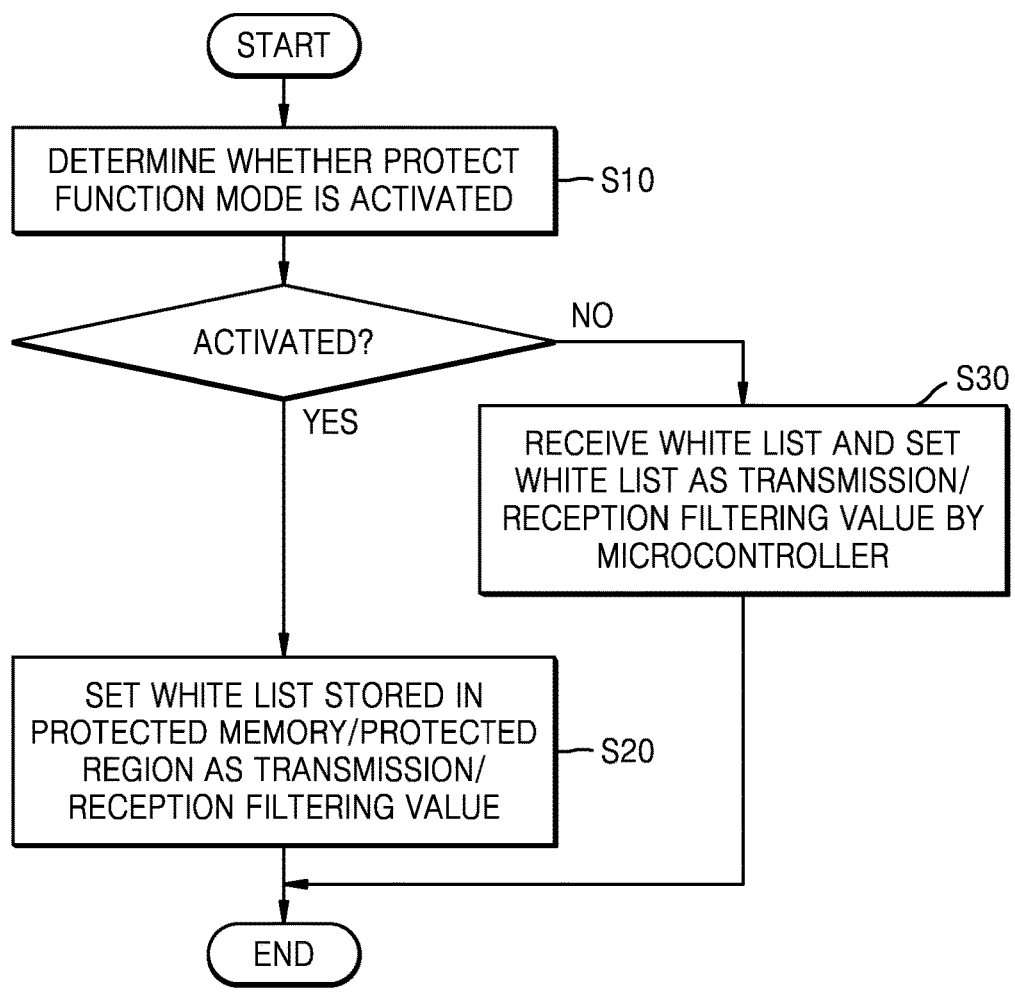
FIG. 4 is a diagram showing a method of setting filtering values according to an embodiment of the disclosure in the chronological order.

FIG. 4 is a diagram showing a method of setting filtering values according to an embodiment of the disclosure in the chronological order.

As shown in FIG. 4, first, the CAN controller 30 or the filtering value setting unit 33 determines whether the protect function mode is activated (operation S10). Determination of whether the protect function mode is activated is performed during the initialization of a CAN communication.

When the protect function mode is activated, a white list stored in the protected memory 38 or a protected region in the protected memory 38 is retrieved and values thereof are set as transmission filtering values or reception filtering values (operation S20). The white list is a list of message IDs that are allowed to be transmitted or received. The white list may be separately provided for a transmission filter and a reception filter, and transmission filtering values and reception filtering values are set separately from each other.

When the protect function mode is not activated, in the administrator mode or the test mode, transmission filtering values or reception filtering values may be set according to instructions of the microcontroller 40 (operation S30). In detail, filtering values are received through a serial peripheral interface (SPI) communication according to instructions of the microcontroller 40 and transmission filtering values or reception filtering values are set. Alternatively, using a register (not shown) provided in the ECU 10, filtering values (or a white list) are temporarily stored in the register and values stored in the register are set to transmission filtering values or reception filtering values.

Figure 5:
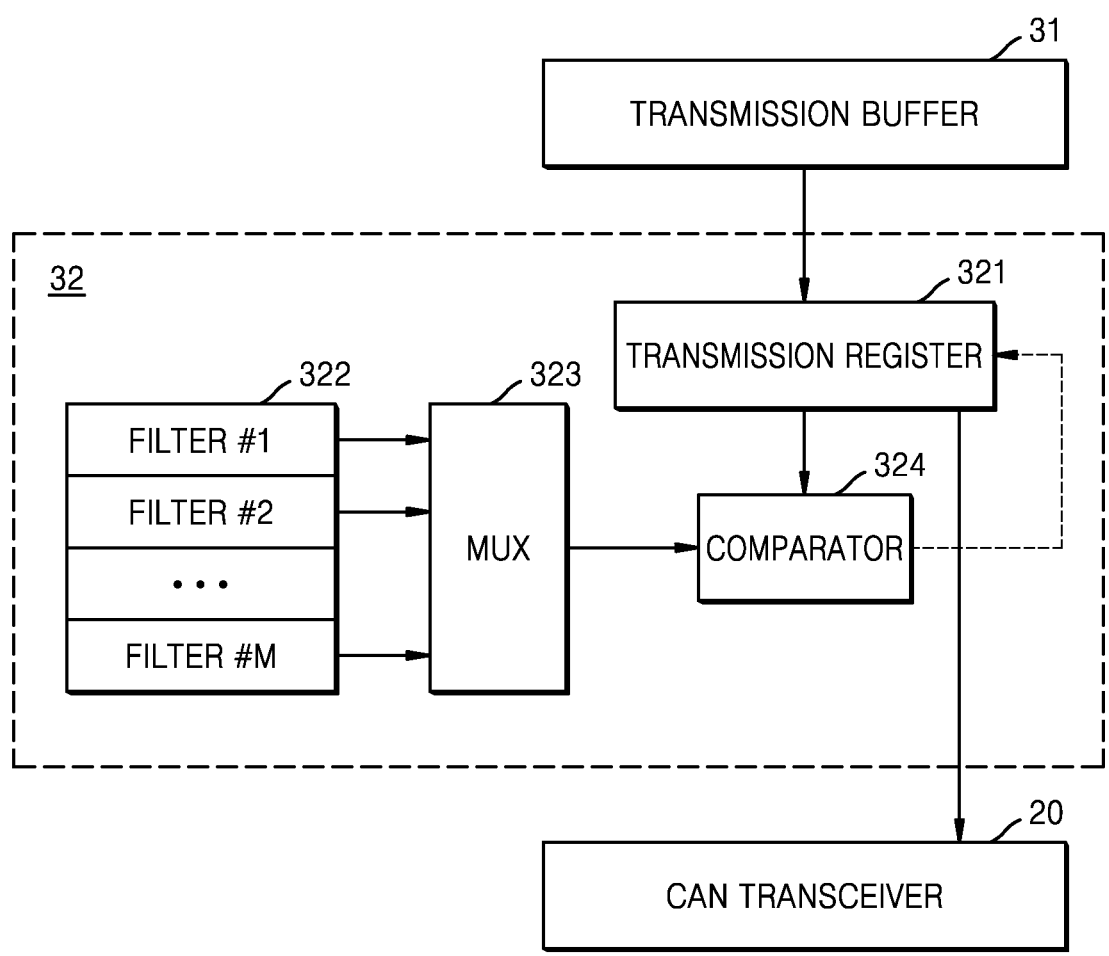
FIG. 5 is a diagram for describing a configuration in which a transmission filter filters transmission data according to an embodiment of the disclosure.

FIG. 5 is a diagram for describing a configuration in which a transmission filter filters transmission data according to an embodiment of the disclosure.

As shown in FIG. 5, the transmission filter 32 according to the disclosure includes a transmission register 321 for temporarily storing transmission data, a transmission filter 322 in which a plurality of filters are recorded, a multiplexer (Mux) 323 that selects and outputs one of the plurality of filters, and a comparator 324 that compares transmission filtering values with the transmission register 321.

In other words, the transmission register 321 temporarily stores transmission data obtained from the transmission buffer 31. Also, the transmission filter 322 stores a plurality of filtering values or a white list, and only one filtering value is selected by the Mux 323. The comparator 324 performs filtering by comparing a message ID of the transmission data of the transmission register 321 with the filtering value. The transmission register 321 is controlled to transmit a result of the comparison by the comparator 324 to the CAN transceiver 20 or to block transmission thereof.

In particular, the transmission filter 322 is set during the initialization described above, and the filtering values are valid message IDs that may be transmitted. Therefore, the transmission data of the transmission register 321 is transmitted to the CAN transceiver 20 only when at least a same result is obtained by the comparator 324. Therefore, unless a result indicating that the message ID is the same as any filtering value of the transmission filter 322, transmission data is not transmitted to the CAN transceiver 20. In other words, since the message ID is invalid, corresponding transmission data is blocked.

Figure 6A:
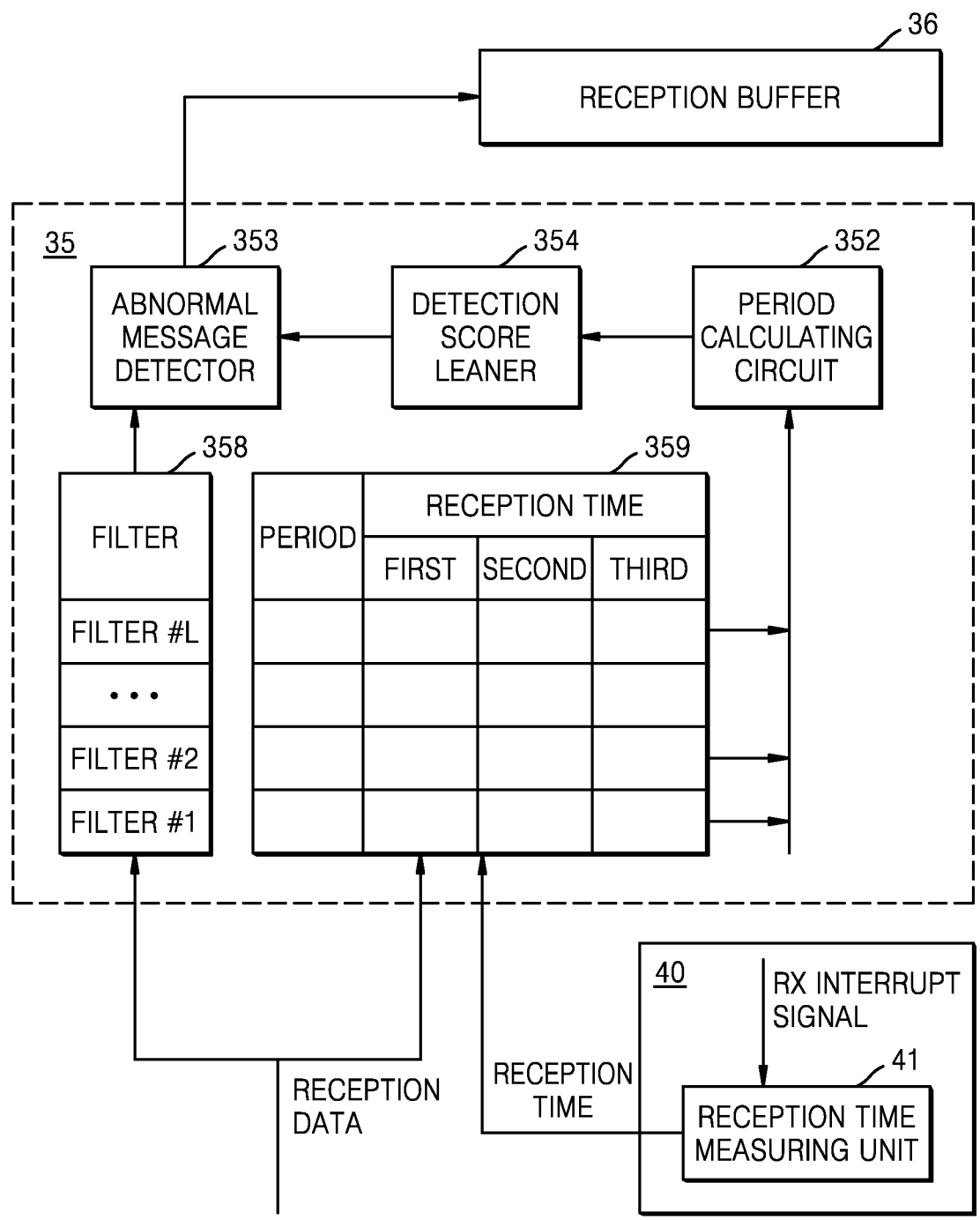
FIGS. 6A and 6B are diagrams for describing configurations in which a reception filter filters reception messages according to an embodiment of the disclosure.
Figure 6B:
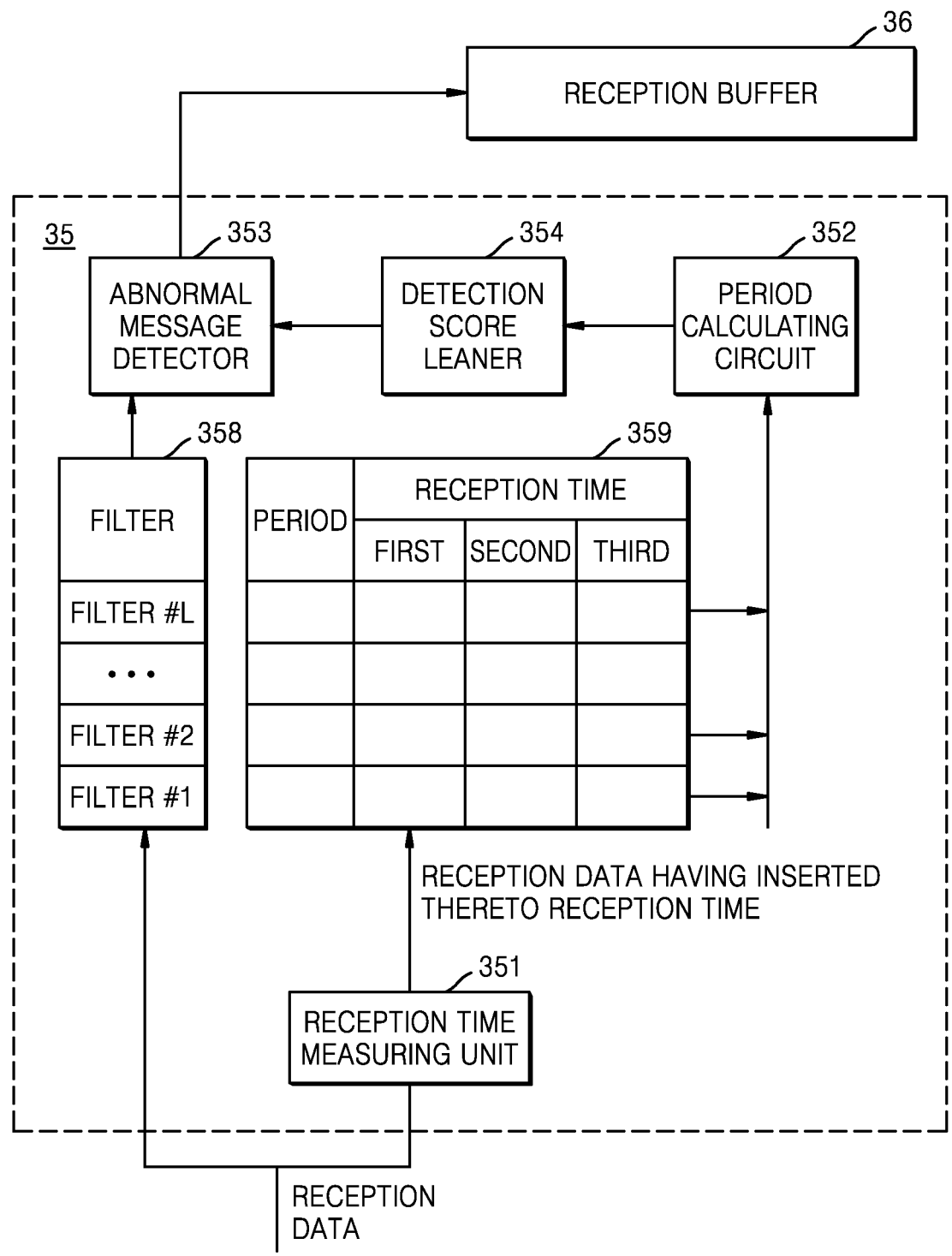

FIGS. 6A and 6B are diagrams for describing configurations in which a reception filter filters reception messages according to an embodiment of the disclosure.

First, FIG. 6A shows the detailed configuration of the reception filter 35 when the microcontroller 40 generates an Rx interrupt signal and measure a reception time, in continuation from the embodiment of FIG. 2A.

As shown in FIG. 6A, the reception filter 35 includes a period calculating circuit 352 that compares a difference between reception times with a period, an abnormal message detector 353 that determines whether a message is an abnormal message by using a reception filter and a result of a period calculation, a detection score learner 354 that applies a learning algorithm to a result of a period calculation, an ID filter table 358 for recording IDs allowed to be received, and a reception time table 359 for recording reception times. In detail, the ID filter table 358 is configured with a storage space for recording reception ID filters allowed to be received, and the reception time table 359 is configured with a storage space for recording message IDs, reference periods, and reception times. The ID filter table 358 and the reception time table 359 may include 2-dimensional registers, memories, caches, etc.

First, the ID filter table 358 receives a reception message and filters the reception message by comparing reception ID filters allowed to be received stored in the ID filter table 358 with the message ID of the reception message. At this time, reception ID filters allowed to be received of the ID filter table 358 may be obtained from the protected memory 38.

Also, the reception time table 359 may include a reference period of reception messages, obtained from the protected memory 38. At this time, the reference period may be a value expected as a time difference between reception messages when normal messages are received. Also, reception times of reception messages may be recorded in the reception time table 359 based on reception messages in which reception times measured by the reception time measuring unit 41 are inserted. As described above, the microcontroller 40 according to an embodiment of the disclosure may generate an Rx interrupt signal when the ECU 10 receives a message from a CAN bus, and, based on the generation of the Rx interrupt signal, the reception time measuring unit 41 may measure the reception time of a reception message and provide it to the reception filter 35.

At this time, the reception time includes at least three fields. Each field stores a reception time. The fields of the reception time includes at least three shift registers, and stored values are shifted forward whenever a reception message of the corresponding message ID is received. In other words, a first reception time, which was the oldest received is discarded, a second reception time moves to a first shift register, and third data moves to a second shift register. The latest reception time is recorded in a last shift register.

Next, the period calculating circuit 352 is a circuit for comparing differences between a reference period recorded in the reception time table 359 and reception times of at least three reception messages and outputting result values of the comparison. The period calculating circuit 352 may calculate a difference between a first reception time and a third reception time and output a result of determining whether the calculated difference is smaller than the period. Meanwhile, the period calculating circuit 352 includes a subtractor to compare a difference between reception times with the reference period.

A CAN communication control system of the disclosure is based on a real-time operating system, and CAN messages related to electronic controls of the ECU 10 may be transmitted periodically. At this time, a plurality of CAN IDs may be allocated to one ECU 10, and messages having electronic control-related CAN IDs may be periodically updated and transmitted to a CAN bus. Therefore, abnormal messages, such as malicious messages for hacking attacks, are likely to conflict with normal messages from a periodic point of view. In consideration of this, the period calculating circuit 352 may compare differences between reception times of the reception messages with a pre-set period. In the disclosure, when a difference between reception times of reception messages is smaller than a reference period, a period calculation result satisfies a blocking condition, and reception messages are determined as abnormal messages.

In detail, when three messages are sequentially received for a particular CAN ID, the period calculating circuit 352 may set reception times thereof as T1, T2, and T3 (where T3 is the reception time of the most recently received message) according to the order that the three messages are received and calculate a value of [T3-T1]. Also, the period calculating circuit 352 may determine whether [T3-T1 <a predetermined period for the corresponding CAN ID] and, when the inequality is satisfied, the period calculating circuit 352 may determine that a period calculation result satisfies a blocking condition.

Next, the abnormal message detector 353 extracts the message IDs of received data and determines whether the extracted message IDs exist in the reception time table 359. The abnormal message detector 353 blocks the reception messages when the extracted message IDs do not exist in the reception time table 359.

Also, the abnormal message detector 353 transmits or blocks reception messages to the reception buffer 36 according to calculation results of the period calculating circuit 352. In other words, when a calculation result of the period calculating circuit 352 indicates that a difference between reception times of reception messages is smaller than a reference period, the reception messages are blocked. When the calculation result indicates that the difference between reception times is not smaller than the reference period, the reception messages are transmitted to the reception buffer 36.

According to an embodiment, when [T3-T1 <a predetermined period for a corresponding CAN ID], that is, when a period calculation result satisfies a blocking condition, the abnormal message detector 353 may determine that an abnormal message has occurred. Alternatively, the abnormal message detector 353 may not immediately determine a reception message as an abnormal message, even when a period calculation result of the period calculating circuit 352 satisfies the blocking condition, and may determine that an abnormal message has occurred based on a result of a score detection of the detection score learner 354 described below.

Meanwhile, in another embodiment of the disclosure, the abnormal message detector 353 may control the period calculating circuit 352 to perform filtering on a corresponding message based on the reception time thereof only when an extracted message ID exists as a reception ID filter in the reception time table 359. In other words, the abnormal message detector 353 may control the period calculating circuit 352 to perform reception time filtering only when a reception message passes an ID filtering.

Also, according to an embodiment of the disclosure, the CAN controller 30 may further include the detection score learner 354. The detection score learner 354 may additionally apply a detection learning algorithm to a period calculation result of the period calculating circuit 352.

In this regard, it is difficult to determine a corresponding message as an abnormal message every time a period calculation result by the period calculating circuit 352 as described above satisfies a set blocking condition. This is because period of receiving messages may be incorrect due to noise even in a normal case, due to characteristics of an embedded environment. Therefore, the disclosure may utilize a detection score learning algorithm capable of detecting abnormal messages more accurately than a period calculation.

In detail, the detection score learner 354 increases a detection score for a corresponding CAN ID by a pre-set value every time a period calculation result by the period calculating circuit 352 satisfies a blocking condition. If the blocking condition is not satisfied, the detection score for the corresponding CAN ID is decreased by a predetermined value. Every time a message is received in the way, the detection score may be adjusted. When the detection score becomes equal to or greater than a pre-set value, it may be determined for certain that an abnormal message has been received.

When it is determined that an abnormal message has been received, the abnormal message detector 353 may block reception of messages for the corresponding CAN ID and stop receiving messages for the corresponding CAN ID for a certain period of time or permanently, or be operated in a certain mode designed to operate with only a minimum function under a fault condition (e.g., a limp home mode).

Meanwhile, the detection score calculated by the detection score learner 354 may be stored in a non-volatile memory. This is to ensure that a learned detection score is reflected without disappearing even when the ECU 10 is reset due to a problem of the ECU 10 itself. In particular, a non-volatile memory region in which the detection score is stored may be a protected region of the protected memory 38.

Also, FIG. 6B shows the internal configuration of the reception filter 35 when the CAN controller 30 directly measures reception times, in continuation from the embodiment of FIG. 2B.

As shown in FIG. 6B, the CAN controller 30 includes a reception time measuring unit 351 and may directly measure reception times of reception messages and record the reception times in the reception time table 359. In an embodiment of the disclosure, a reception time insertion unit 34 may measure a reception time by using a time triggering scheme. In a particular embodiment, the reception filter 35 may measure a reception time by using a time triggered controller area network (TTCAN) module in the CAN controller 30. The reception time measuring unit 351 transmits a measured reception time to the reception time table 359.

Although a scheme in which the microcontroller 40 measures a reception time as in the embodiments of FIGS. 2A and 6A may be easily implemented on a general microcontroller 40, there may be a slight difference between a time point at which an actual message is received and a reception time measured by an Rx interrupt signal, depending on the performance of the microcontroller 40. On the contrary, when a reception time is directly measured by the CAN controller 30 as in the embodiments of FIGS. 2B and 6B, the reception time measuring unit 351, which is a module for measuring a reception time, needs to be separately provided in the CAN controller 30. However, measuring a reception time through the CAN controller 30 is not dependent on the microcontroller 40, is not affected by a load, and provides more accurate reception time than the scheme using an Rx interrupt signal.

According to an embodiment of the disclosure, in a case where the embodiments of FIGS. 2B and 6B are employed and a module functioning as the reception time measuring unit 351 is not included in the CAN controller 30, reception times of reception messages may be measured by using the embodiment of FIGS. 2A and 6A.

Figure 7:
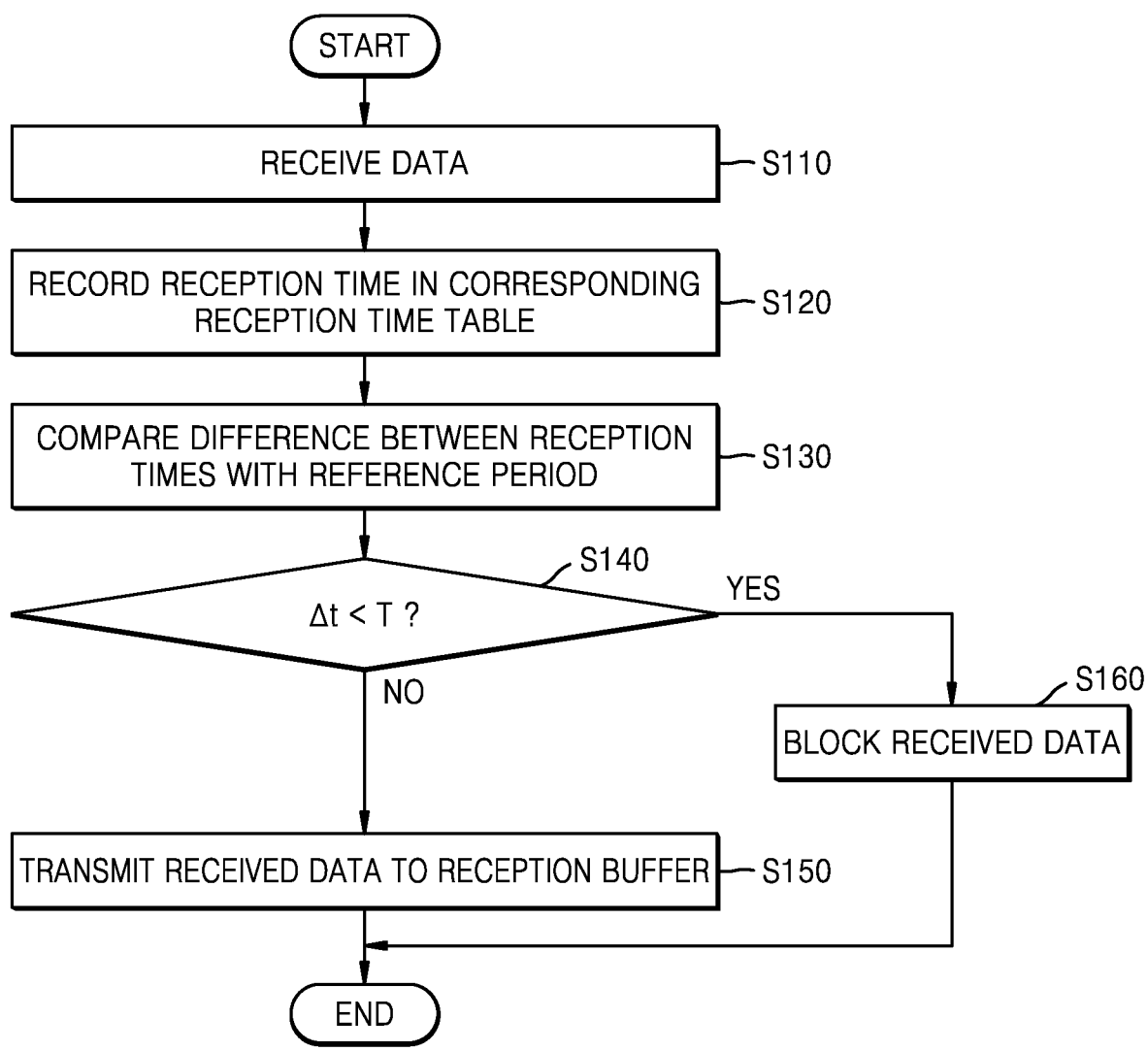
FIGS. 7, 8A, and 8B are diagrams showing a method of filtering reception data according to an embodiment of the disclosure in the chronological order.
Figure 8A:
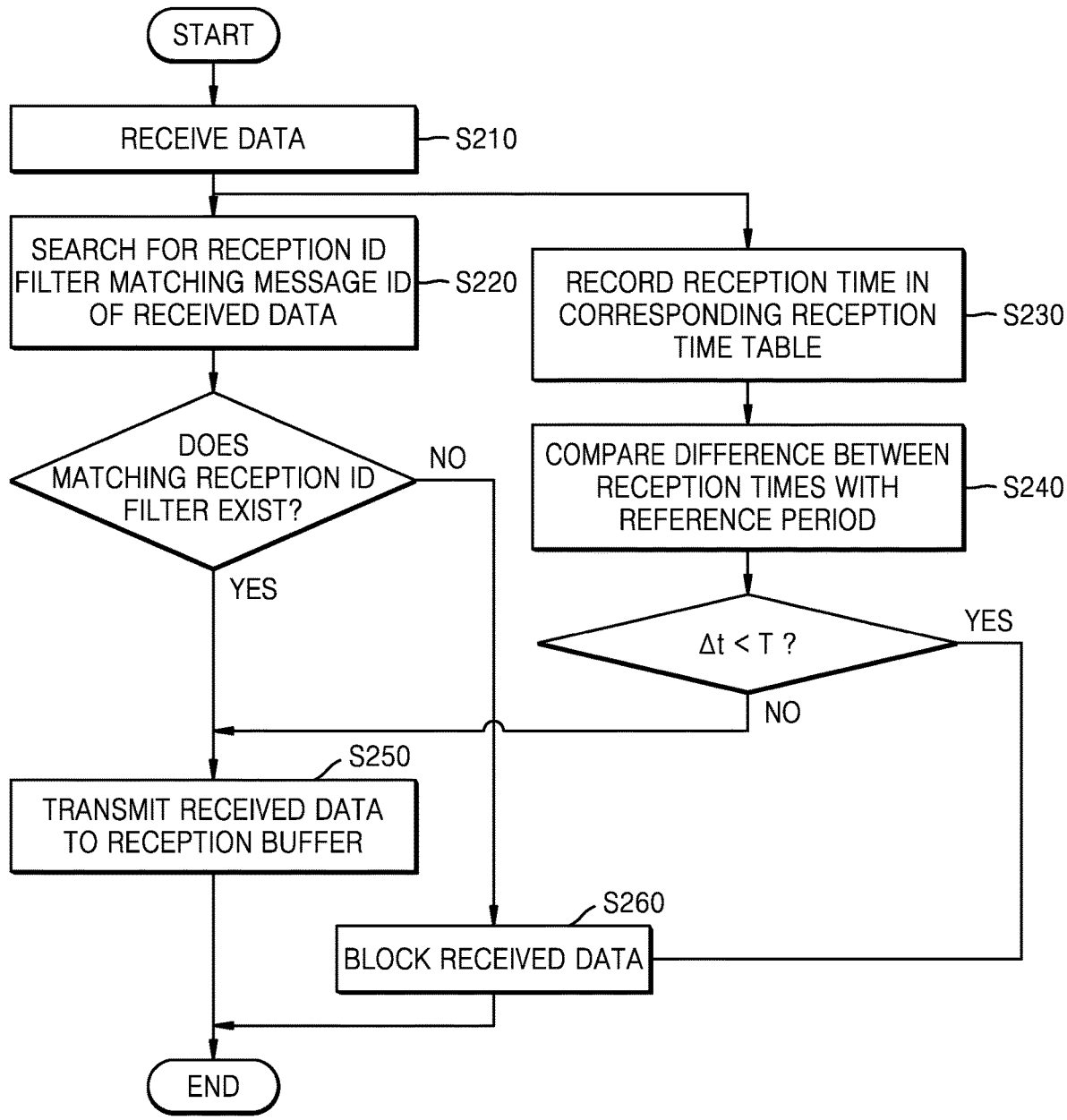
Figure 8B:
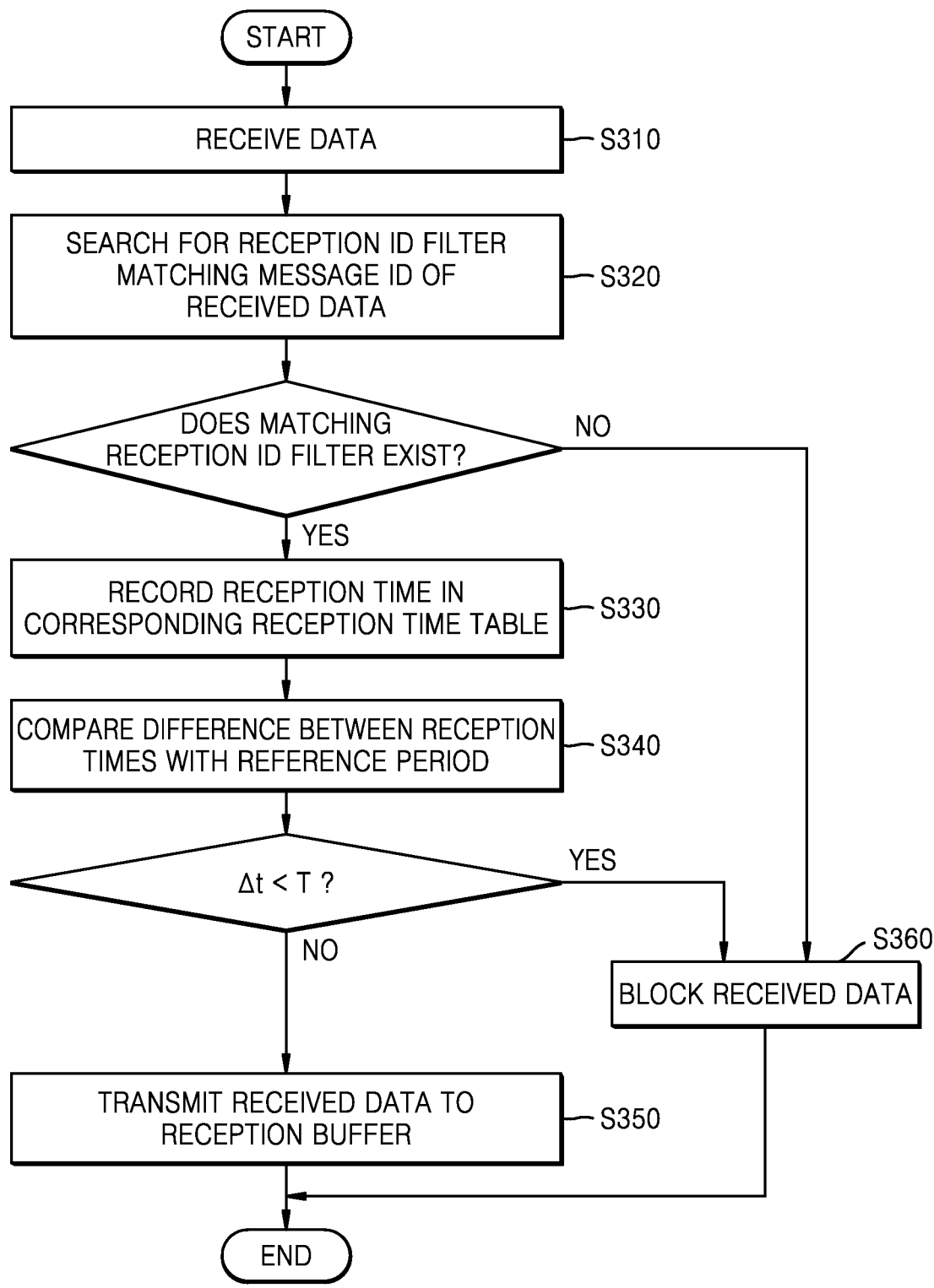

FIGS. 7, 8A, and 8B are diagrams showing a method of filtering reception data according to an embodiment of the disclosure in the chronological order. Hereinafter, a method of filtering reception messages according to an embodiment of the disclosure will be described in more detail with reference to FIGS. 7, 8A, and 8B.

First, FIG. 7 chronologically shows operations for filtering reception messages through reception time filtering. In more detail, first, the CAN controller 30 receives messages (operation S110). Next, after the reception messages are received, the CAN controller 30 records reception times thereof in a reception time table (operation S120). At this time, according to embodiments of the disclosure, the CAN controller 30 obtains times measured by the microcontroller 40 together with the reception messages or the CAN controller 30 directly measures reception times of the reception messages. Also, reception time shift registers of the reception time table are shifted, so that the oldest reception time is discarded and a current reception time is recorded as the latest reception time.

Also, the CAN controller 30 calculates a difference between reception times in the reception filter, of a corresponding message ID and compares the difference with a reference period of the reception time table (operation S130). The difference Δt between a first reception time and a third reception time may be obtained, and the obtained difference Δt is compared with a reference period T.

When the difference Δt between reception times is smaller than the reference period T, corresponding reception messages are blocked (operation S160). According to the CAN communication protocol, an ECU needs to transmit data at least once per period time when the ECU transmits data. Therefore, the time between the third reception time and the first reception time need to be longer than the period time. When the difference between the first reception time and the third reception time is smaller than the period, it may be considered that there is an abnormal message therebetween. In other words, at least one of first, second, and third messages may be an abnormal message. Therefore, the CAN controller 30 determines that an abnormal message has been received and blocks received data or warns that an abnormal message has been detected.

Finally, when the difference between reception times is greater than the reference period, the reception messages are transmitted to the reception buffer (operation S150).

In a scheme that reception messages are filtered by using only reception time filtering as shown in FIG. 7, unlike embodiments of FIGS. 8A and 8B described below, all CAN messages existing in a CAN communication may be monitored based on reception periods without reception ID filtering. Therefore, the scheme may be applied to a security gateway connected to the CAN bus 50, rather than to individual ECUs 10.

Next, FIGS. 8A and 8B are diagrams showing a method in case of performing reception ID filtering and reception time filtering together in the chronological order.

As shown in FIG. 8A, first, the CAN controller 30 receives messages (operation S210).

Next, the CAN controller 30 extracts message IDs from the reception messages and determines whether there is matching reception ID filters in the ID filter table 358 by searching for the ID filter table 358. (operation S220). The message ID is data stored in the CAN header of a reception message and is information regarding the identifier of the reception message. In other words, the message IDs are extracted from the CAN header 210 of the reception messages 200. Next, reception ID filters matching the extracted message IDs are searched for.

Next, when there is no matching reception ID filter in the ID filter table 358, the corresponding reception message is blocked (operation S260). In other words, since the ID filter table 358 is a white list of message IDs that are allowed to be received, when a message ID does not exist in the white list, the corresponding reception message is not an allowed message. Therefore, the corresponding reception message is blocked.

Meanwhile, after receiving the reception messages, the CAN controller 30 records reception times in the reception time table (operation S230). Descriptions related to reception time filtering identical to those given above with reference to FIG. 7 will be omitted.

Next, the CAN controller 30 calculates a difference between reception times in the reception filter, of a corresponding message ID and compares the difference with a reference period of the reception time table (operation S240). The difference Δt between a first reception time and a third reception time may be obtained, and the obtained difference Δt is compared with a reference period T. When the difference Δt between reception times is smaller than the reference period T, corresponding reception messages are blocked (operation S260).

Finally, when reception ID filters matching the message IDs of the reception messages exist in the ID filter table 358 or a difference between reception times is greater than the reference period, the reception messages are transmitted to a reception buffer (operation S250).

FIG. 8B is a diagram showing a method of filtering reception data according to another embodiment of the disclosure in the chronological order. As shown in FIG. 8B, first, the CAN controller 30 receives messages (operation S110).

Referring to FIG. 8B, an ID filtering operation S320 and reception time filtering operations S330 and S340 are the same as those of FIG. 8A, except that, in FIG. 8B, reception time filtering is performed only when there is a matching reception ID signal filter. In other words, FIG. 8B shows a modification of the embodiment of FIG. 8A, that is, a configuration in which reception time filtering is performed only on messages passed the ID filtering operation S320.

The disclosure has been described with reference to the CAN controller 30. Meanwhile, in another embodiment of the disclosure, a method related to the operation of the CAN controller 30 described above may be implemented as an embodiment. In other words, according to another embodiment of the disclosure, the operations of the CAN controller 30 described herein may be implemented as a method including time series operations, wherein the subject of the method may not necessarily be the CAN controller 30. For example, a method of performing the operations described in FIGS. 4, 7, 8A, and 8B may be an embodiment of the disclosure, wherein the method of performing the operations may be performed by a device other than the CAN controller 30.

At this time, the subject performing the method according to another embodiment of the disclosure may be a processor embedded in the ECU 10, wherein instructions stored in the processor may control the ECU 10 and the CAN controller 30 according to embodiments of the disclosure. Therefore, the case may be applied to electronic ECUs in various fields using a CAN communication, such as construction heavy equipment and agricultural tractors, as well as automobiles. Alternatively, the subject performing the method according to another embodiment of the disclosure may be an auxiliary ECU connected to the ECU 10 in the form of a H/W type connector. In this case, the auxiliary ECU needs only to be connected to the ECU 10, and thus no H/W or S/W modification is necessary. Alternatively, the subject performing the method according to another embodiment of the disclosure may be a semiconductor device embedded in the CAN controller 30, and a S/W of the semiconductor device may be designed to perform the method of the disclosure. Alternatively, the subject performing the method according to another embodiment of the disclosure may be a security gateway connected to a CAN bus. In this case, the security gateway may filter all CAN messages of a connected CAN bus network through reception period filtering without being connected to individual ECUs.

Figure 9:
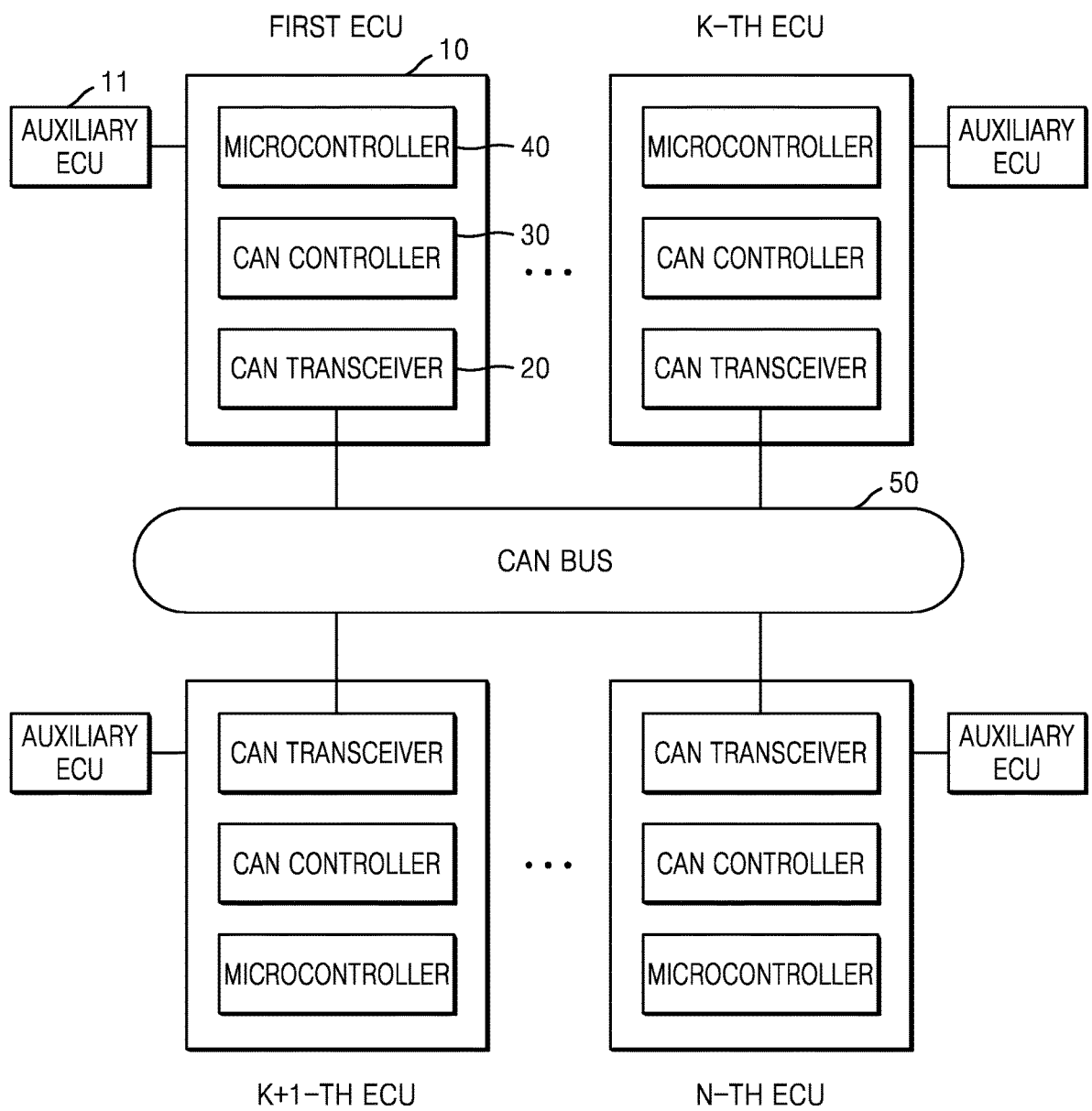
FIGS. 9 and 10 are diagrams for describing an embodiment in which the method of the disclosure is performed by an auxiliary ECU.
Figure 10:
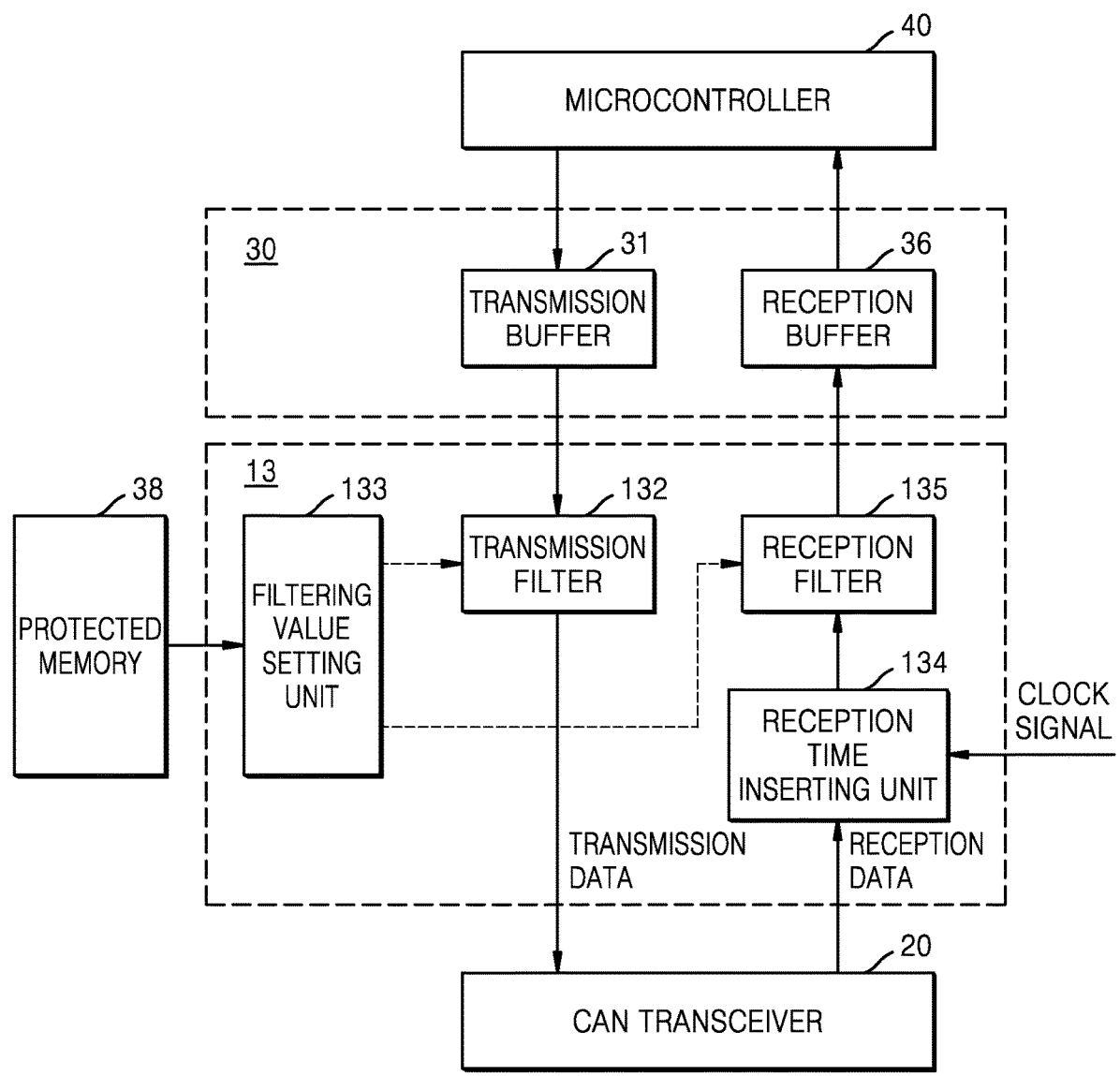

FIGS. 9 and 10 are diagrams for describing an embodiment in which the method of the disclosure is performed by an auxiliary ECU.

Referring to FIG. 9, an auxiliary ECU 11 is connected to the ECU 10. The auxiliary ECU 11 may include a processor in which instructions for controlling the ECU 10 according to the method of the disclosure are stored. Also, as shown in FIG. 10, the auxiliary ECU 11 may include a processor 13. The processor 13 may include a filtering value setting unit 133, a transmission filter 132, and a reception filter 135, which may perform the same functions as those of the filtering value setting unit 33, the transmission filter 32, and the reception filter 35 of the CAN controller 30 shown in FIG. 2B, respectively. In detail, in operation S120 of FIG. 7 (searching the ID filtering table for matching the message ID of the reception message) matching a message ID of a reception message), the reception filter 135 of the auxiliary ECU 11 may search for an ID filtering table matching the message ID of the reception message or control the ECU 10 to perform the above-stated operation in the embodiments of FIGS. 9 and 10.

Hereinafter, a CAN communication-based bypass attack detection method and system according to another embodiment of the disclosure will be described.

Referring back to FIG. 1, the CAN communication of the disclosure shown in FIG. 1 may not only be applied to a general CAN communication, but also extended to an extended CAN and a CAN with flexible data-rate (CAN-FD). Also, a CAN communication of the disclosure may be mounted on an automobile, heavy construction equipment, a tractor, etc. CAN communications may be divided into a vehicle CAN and a diagnostic-CAN. The vehicle CAN is a network used in a communication process between ECUs while driving, and the diagnostic-CAN is used for special purposes such as maintenance, detection of faulty parts and causes, fault codes (DTC), firmware update, and diagnostic. The diagnostic-CAN may affect the vehicle CAN. In particular, a reprogramming service for firmware update and a communication control-related service may serve to stop the vehicle CAN temporarily or, under particular conditions, permanently. The diagnostic-CAN complies with the unified diagnostic services (UDS) standard, which is the international standard. The UDS is defined in standards ISO 14229 and ISO 15765-3. An embodiment of the disclosure provides a configuration for detecting a hacker's bypass attack using such a diagnostic-CAN, which will be described below.

Also, in the descriptions below, for convenience of explanation, from among the ECUs 10 connected to the CAN bus 50, an ECU that is a target of a hacker's attack (that is, a target receiving an abnormal message due to a hacking attack) may be referred to as a target ECU, and the target ECU may typically be an autonomous driving-related ECU of a vehicle. Also, an ECU to be monitored to determine whether the ECU becomes an idle state due to a hacking attack may be referred to as ECU for detection (an ECU for detection is a normal ECU before becoming idle by a hacker's attack). Also, an ECU that transmits an abnormal CAN message that mimics a normal CAN message by a hacker will be referred to as an abnormal ECU.

According to an embodiment of the disclosure, the target ECU may determine whether messages having CAN IDs transmitted by other ECUs ECUN are normal CAN messages transmitted by normal ECUs or abnormal CAN messages that mimic normal CAN messages and are transmitted by an abnormal ECU. In particular, according to an embodiment of the disclosure, it may be determined whether a normal ECU has become incapable of transmitting a message due to a hacking attack and whether a received CAN message is an abnormal CAN message from a hacker that mimic a normal CAN message. To this end, according to the disclosure, the target ECU receives CAN messages having a CAN ID assigned to a request or a response for the diagnostic-CAN and may monitor and determine whether a corresponding ECU for detection is currently in a normal message transmission state or a message transmission incapacitated state in real time. In other words, when the target ECU receives CAN messages having a CAN ID corresponding to a request or a response for the diagnostic-CAN, the target ECU may monitor the state information of the ECU corresponding to the CAN ID and determine whether CAN messages received later are normal according to a result of the monitoring.

The target ECU is capable of monitoring whether the ECU for detection is in a normal message transmission state or a message transmission incapacitated state as described above, because, since the diagnostic-CAN complies with the international standard, there are identifiable patterns in sequences that cause the message transmission incapacitated state.

Hereinafter, the internal configuration of the CAN controller 30 of the target ECU will be described to describe the disclosure in more detail.

Figure 11:
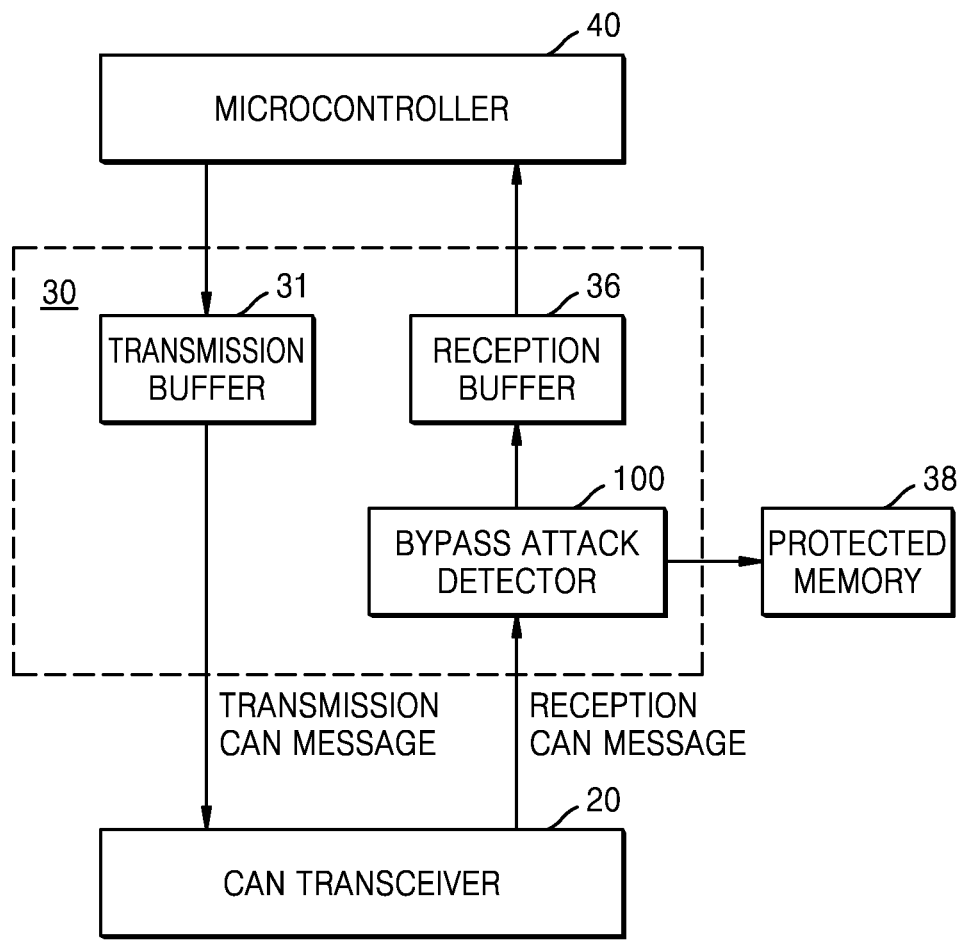
FIG. 11 is a block diagram showing an internal configuration of the CAN controller according to an embodiment of the disclosure.

FIG. 11 is a block diagram showing an internal configuration of the CAN controller according to an embodiment of the disclosure.

Referring to FIG. 11, the CAN controller 30 according to the disclosure includes the transmission buffer 31 for temporarily storing data to transmit, a bypass attack detector 100 for detecting whether there is a hacker's bypass attack in relation to a reception message, and the reception buffer 36 for temporarily storing reception messages. Also, the CAN controller 30 further includes a protected memory 38 for storing a filtering value.

The transmission buffer 31 includes a buffer and temporarily stores data to transmit in the buffer. In particular, the microcontroller 40 stores data to transmit (or transmission data) in the buffer of the transmission buffer 31.

The transmission buffer 31 sequentially stores transmission data in a buffer, stores the transmission data in the order received by the microcontroller 40, and transmits the transmission data through the CAN transceiver 20 in the order received. In other words, the transmission buffer 31 sequentially stores transmission data including the CAN header 210 and the CAN payload 220 as described above with reference to FIG. 3 in a buffer, stores the transmission data in the order received by the microcontroller 40, and then transmits the transmission data through the CAN transceiver 20 in the order received.

Next, the reception buffer 36 stores reception CAN messages in the reception buffer 36. According to an embodiment of the disclosure, the reception buffer 36 may store only messages determined as normal CAN messages by the bypass attack detector 100 in the reception buffer 36. The reception CAN messages stored in the reception buffer 36 are transmitted to the microcontroller 40.

Also, the bypass attack detector 100 determines whether a reception CAN message is a normal CAN message or an abnormal CAN message due to a hacker's bypass attack before transmitting the corresponding reception CAN message to the reception buffer 36. According to an embodiment of the disclosure, the bypass attack detector 100 determines whether an ECU for detection corresponding to an abnormal CAN message is incapable of transmitting a message, to determine whether a received CAN message is an abnormal CAN message. This will be described below in more detail with reference to FIG. 12.

Next, the protected memory 38 is a non-volatile memory, such as a read only memory (ROM) or a flash memory, and stores filtering values or a list of message IDs.

The protected memory 38 may include a normal non-volatile memory and a portion of the memory space thereof may be designated as a protected region. In this case, only data stored in the protected region is allowed to be read, and data may be changed or deleted in regions other than the protected region. The protected memory 38 or a protected memory region (protected region) is not accessible by memory address values like an ordinary non-volatile memory (e.g., a flash memory), and a special accessing method and a password are needed to access the protected memory region to read/write data therefrom/thereto.

According to an embodiment of the disclosure, the protected memory 38 stores the states of ECUs for detection, and thus, even when the target ECUs are abnormally terminated, the state information regarding the ECUs for detection may be learned and stored. Also, the protected memory 38 may store learned detection scores regarding ECUs for detections.

Figure 12:
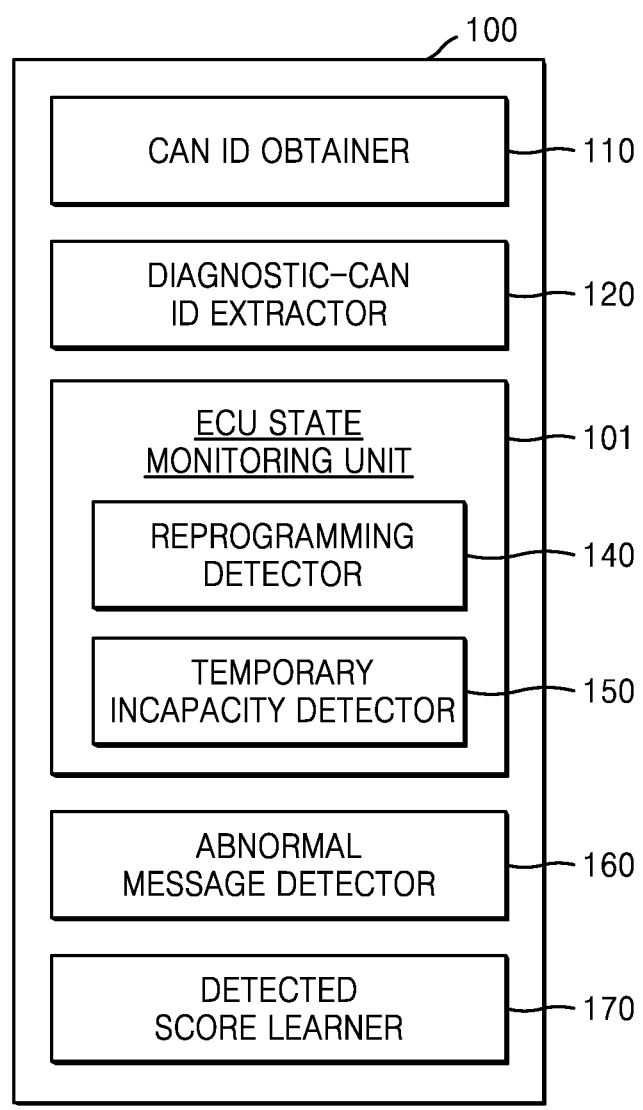
FIG. 12 is a diagram for describing the structure of transmission data according to an embodiment of the disclosure.

According to an embodiment of the disclosure, an ECU including the bypass attack detector 100 as shown in FIG. 11 may be a target ECU. According to an embodiment of the disclosure, a target ECU may be an autonomous driving-related ECU that determines the state of a vehicle by receiving CAN messages from other ECUs and transmits CAN messages for controlling the vehicle's system in relation to autonomous driving of the vehicle. Therefore, a hacker may transmit an abnormal message to lead the target ECU to misunderstand the state of the vehicle, and there is a risk that the target ECU that received the abnormal message from the CAN bus 50 transmits CAN messages for controlling the vehicle's system as the hacker intended. To prevent such a risk, the bypass attack detector 100 of the target ECU according to an embodiment of the disclosure may detect whether a received message is an abnormal message. With reference to FIG. 12, a method of detecting a hacker's bypass attack according to the disclosure will be described based on the configuration of the bypass attack detector 100.

FIG. 12 is a block diagram showing an internal configuration of a bypass attack detector according to an embodiment of the disclosure.

The bypass attack detector 100 according to an embodiment of the disclosure includes a CAN ID obtainer 110, a diagnostic-CAN ID extractor 120, an ID-ECU matching unit 130, an ECU state monitoring unit 101 that includes a reprogramming detector 140 and a temporary incapacity detector 150, an abnormal message determiner 160, and a detection score learner 170.

First, the CAN ID obtainer 110 may generate a CAN ID list CAN_ID_LIST by obtaining pre-set CAN IDs. A CAN ID refers to an identifier regarding each piece of transmission data in the structure of transmission data of a CAN communication. CAN IDs that a target ECU receives from other ECUs for detection may be defined in advance, and the CAN IDs may be values assigned to the respective ECUs for detection in advance.

Figure 13A:
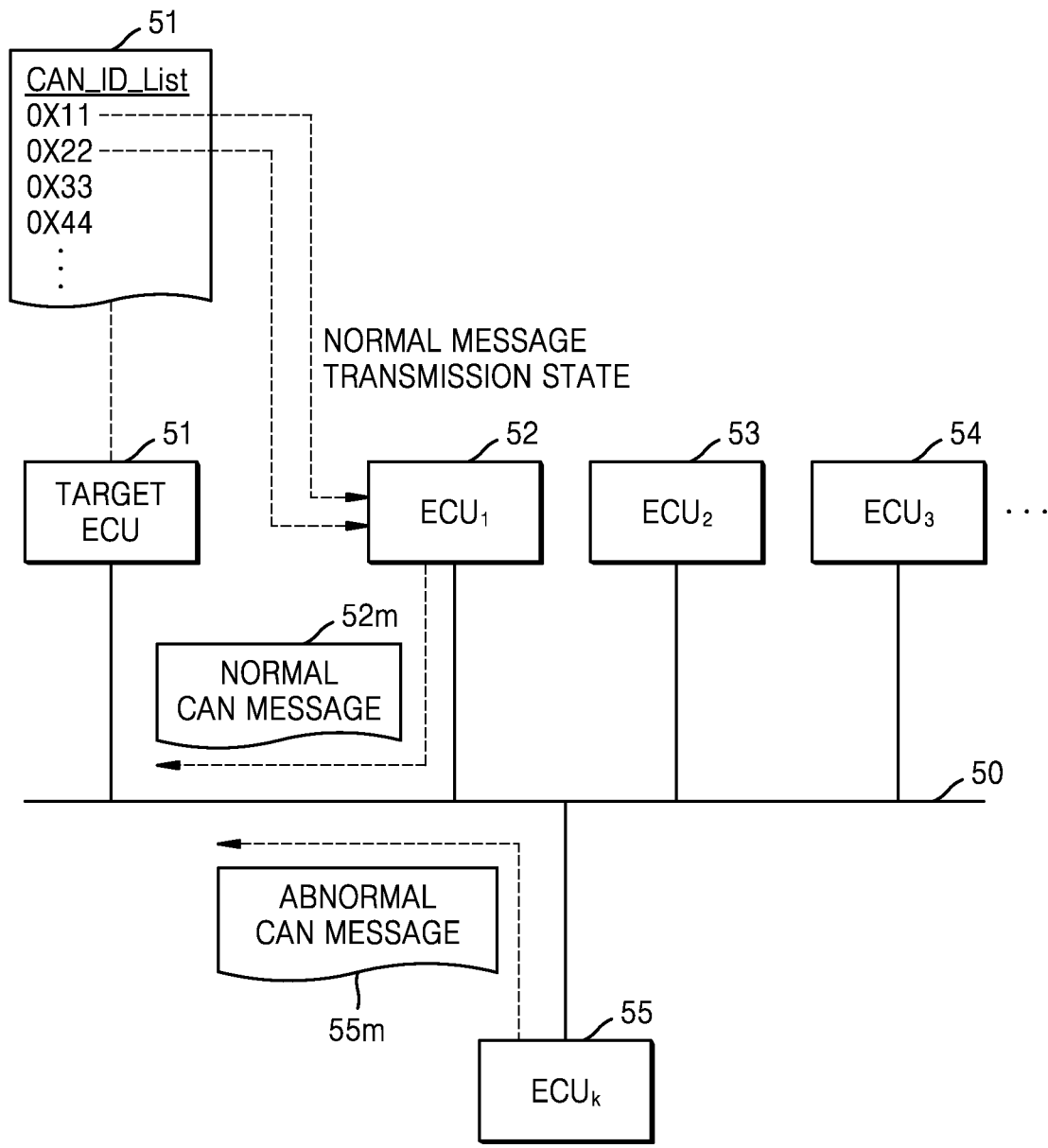
FIGS. 13A and 13B are diagrams for describing a process in which an abnormal message is received by a target ECU due to a hacker's attack.
Figure 13B:
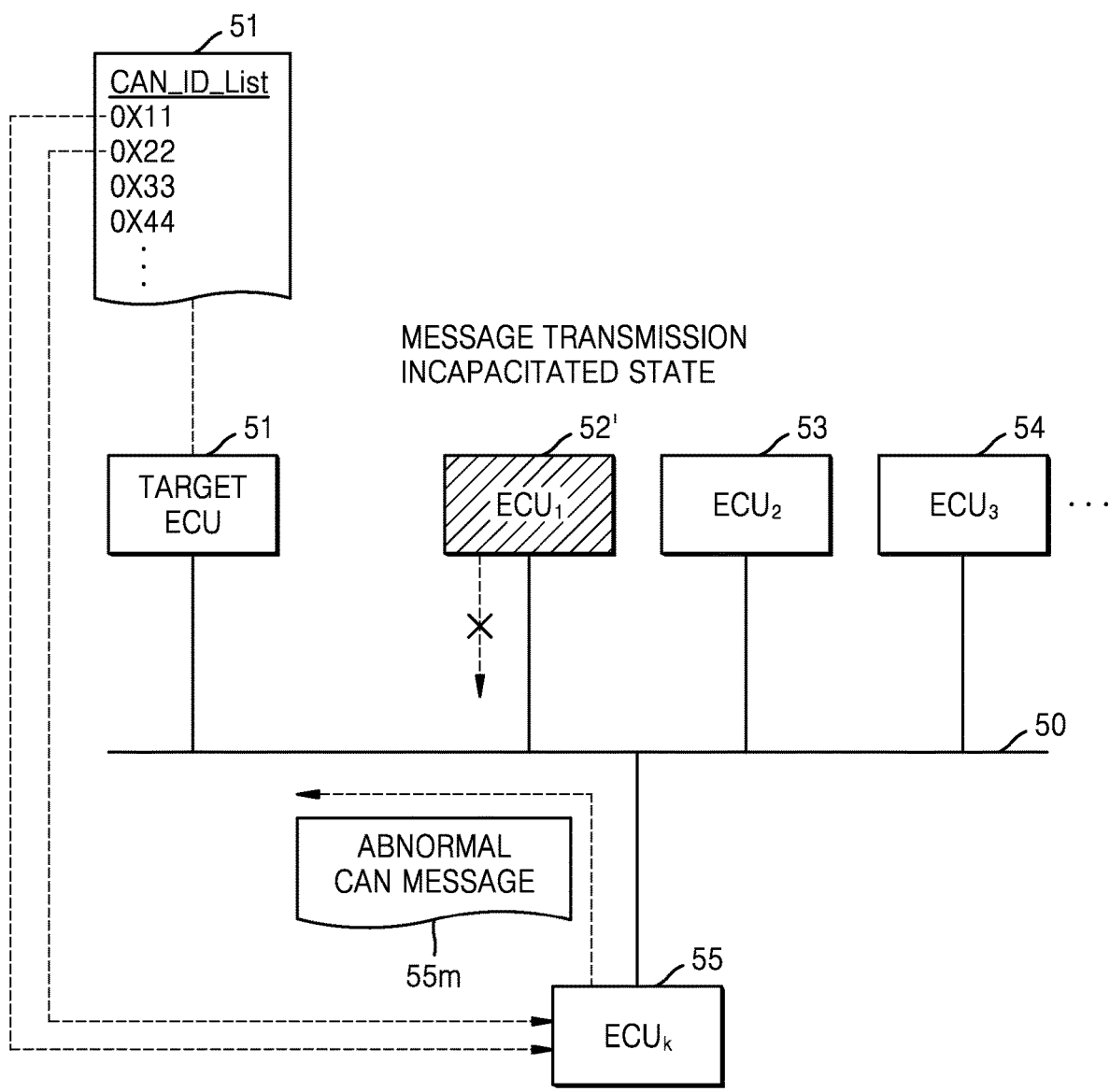

FIGS. 13A and 13B are diagrams for describing a process in which an abnormal message is received by a target ECU due to a hacker's attack.

Referring to FIG. 13A, the target ECU 51 generates a CAN ID list CAN_ID_LIST, and the CAN ID list CAN_ID_LIST may include CAN IDs 0x11, 0x22, 0x33, and 0x44. Also, there are an $ECU_1$ 52, an $ECU_2$ 53, and an $ECU_3$ 54, which are ECUs for detection, and, the $ECU_1$ 52 may broadcast messages having CAN IDs 0x11 and 0x22 to the CAN bus 50 when the $ECU_1$ 52 is in a normal ECU state, that is, a normal message transmission state. For example, a normal CAN message 52$m$ may have a CAN ID 0x11. Meanwhile, in the example of FIG. 13A, an $ECU_k$ may exist as an abnormal ECU that is controlled by a hacker and broadcasts an abnormal CAN message 55$m$, and the abnormal CAN message 55$m$ may be a message that mimics a normal CAN message 52$m$. At this time, when both the normal CAN message 52m and the abnormal CAN message 55m are broadcasted on the CAN bus 50, the normal CAN message 52m and the abnormal CAN message 55m conflict with each other, and thus the hacker is unable to accomplish the purpose of the attack. Therefore, as shown in FIG. 13B, the hacker may prevent the normal CAN message 52m from being broadcasted by using a bypass attack that makes the $ECU_1$ 52 to the message transmission incapacitated state. Also, the hacker may broadcast the abnormal CAN message 55m having an CAN ID 0x11 by using the abnormal ECU $ECU_k$. In this case, there is a risk that the target ECU 51 receives only the abnormal CAN message 55m and misjudges the state of the vehicle as intended by the hacker. In order to prevent this, according to an embodiment of the disclosure, the target ECU may monitor whether an ECU for detection is in the message transmission incapacitated state by using a diagnostic-CAN service and determine whether a CAN message is normal according to a result of the monitoring.

The diagnostic-CAN ID extractor 120 may extract a diagnostic-CAN CAN ID corresponding to a diagnostic-CAN-related request or response from among CAN IDs existing in a CAN ID list. In other words, the diagnostic-CAN ID extractor 120 may determine whether the CAN ID of a received CAN message is that of a CAN message using at least one of CAN IDs assigned to a request or a response for diagnostic-CAN.

In detail, as described above, a CAN communication of a vehicle may include a vehicle-CAN and a diagnostic-CAN. At this time, CAN IDs corresponding to respective ECU used for a vehicle-CAN may vary depending on manufacturers of vehicles. Also, CAN IDs corresponding to a request and a response of each ECU used for a diagnostic-CAN may also vary according to manufacturers of vehicles. In other words, CAN IDs corresponding to respective ECUs in a vehicle-CAN and a diagnostic-CAN may vary according to manufacturers of vehicles. However, in a diagnostic-CAN for each ECU connected to a CAN communication, there may be two pre-defined CAN IDs respectively corresponding to a request and a response. For example, a CAN ID corresponding to a request for a diagnostic-CAN may be 0x7E and a CAN ID corresponding to a response may be 0x7E8, but particular CAN IDs for a request and a response may vary according to manufacturers as described above. In other words, service IDs used in a diagnostic-CAN comply with the same international standard regardless of manufacturers, and, according to the disclosure, the state of an ECU for detection may be determined by using the service IDs of the diagnostic-CAN having the characteristics.

Next, the ID-ECU matching unit 130 may match a corresponding ECU for detection to a CAN ID for a diagnostic-CAN. In other words, a corresponding ECU for detection may be matched to an extracted ID for a diagnostic-CAN, and it may be assumed that a matched ECU for detection has received a request or transmitted a response in relation to the diagnostic-CAN. Therefore, a target ECU may monitor whether the state of an ECU that has received or transmitted a diagnostic-CAN related message is in the normal message transmission state or the message transmission incapacitated state, wherein an ECU for detection to be monitored may be selected based on extraction of a CAN ID for the diagnostic-CAN and ECU matching as described above.

Next, the ECU state monitoring unit 101 includes the reprogramming detector 140 and the temporary incapacity detector 150 and determines whether an ECU for detection is in the normal message transmission state or the message transmission incapacitated state.

A CAN communication used in a vehicle transmits CAN messages through broadcasting, and thus, even when one node (ECU) connected to the CAN bus 50 receives a particular CAN message normally, the corresponding CAN message does not disappear. In other words, due to the characteristics of a CAN communication, all ECUs connected to the CAN bus 50 may receive the CAN message broadcasted on the CAN bus 50.

Due to the characteristics of a CAN communication, as described above, in case of a CAN communication-based hacking attack, both an abnormal CAN message from an abnormal ECU due to the hacking attack and a normal CAN message from a normal ECU are broadcasted on the CAN bus, the abnormal CAN message and the normal CAN message may conflict with each other. In this case, the hacker is unable to accomplish his/her desired purpose, and thus the hacker may use a bypass attack technique for preventing a normal ECU from transmitting a normal CAN message to prevent a conflict. At this time, the hacker may use the international standard service of a diagnostic-CAN to prevent transmission of a normal CAN message. Therefore, the ECU state monitoring unit 101 according to an embodiment of the disclosure may monitor the state of an ECU for detection by detecting whether there is CAN IDs for a request and a response for the diagnostic-CAN that incapacitates an ECU for detection in a list of received CAN IDs and, when it is determined that the ECU for detection is in the message transmission incapacitated state, the ECU state monitoring unit 101 may determine that periodic CAN messages received from the corresponding ECU for detection are abnormal messages that mimic normal messages for the hacking attack.

According to an embodiment of the disclosure, the ECU state monitoring unit 101 may set 2N filter IDs (IDs for a request and a response of a diagnostic-CAN) for N ECUs having high priorities (N is equal to or greater than 1) as reception (Rx) filters, and, when a CAN message having a CAN ID corresponding to the filter IDs is detected and a pattern possibly indicating that a corresponding ECU is in the message transmission incapacitated state is detected, the ECU state monitoring unit 101 may determine that the corresponding ECU for detection is in the idle mode (the message transmission incapacitated state). The state information regarding the ECU for detection determined by the ECU state monitoring unit 101 is stored in a non-volatile memory (e.g., the protected memory 38), and thus the state information regarding the ECU for detection may not be lost even when the bypass attack detector 100 is abnormally terminated.

Triggering conditions in which the ECU state monitoring unit 101 determines that ECU for detection is in the message transmission incapacitated state may be, with respect to an ECU for detection, 1) detection of one of Reprogramming 0x03 requests as a sub for an ecuReset service specified in the UDS specification, and 2) a disableNormalMessageTransmission service request specified in the UDS specification, wherein the two triggering conditions may be detected by the reprogramming detector 140 and the temporary incapacity detector 150, respectively.

Meanwhile, the ECU state monitoring unit 101 may refer to a sub-function value as the diagnostic service ID in case of detecting the message transmission incapacitated state of an ECU for detection through the temporary incapacity detector 150 and the reprogramming detector 140. For example, the reprogramming detector 140 may detect the message transmission incapacitated state by referring to whether a sub-function of EcuReset $11 is a reprogramming-related function.

First, the reprogramming detector 140 detects a request for an ECU for detection to enter a reprogramming mode, and more particularly, detects a case where a diagnostic service that performs an EcuReset-related function for firmware reprogramming is triggered. The EcuReset-related function for firmware reprogramming is a service defined as a service ID $11 in the UDS specification.

According to an embodiment of the disclosure, the reprogramming detector 140 monitors the state of an ECU for detection in real time to detect whether the ECU for detection is in the message transmission incapacitated state.

Figure 14:
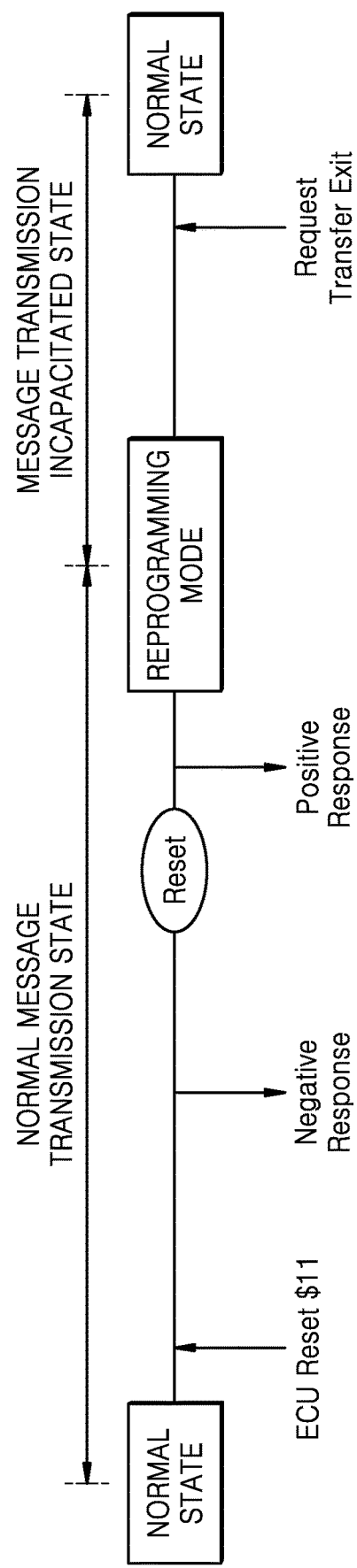
FIG. 14 is a diagram for describing a change of the state of an ECU for detection according to an embodiment of the disclosure.

FIG. 14 is a diagram for describing a change of the state of an ECU for detection according to an embodiment of the disclosure.

Referring to FIG. 14, when an ECU for detection is in the normal state, an EcuReset request (EcuReset $11) may be received. In this case, the ECU for detection first provides a negative response and then provides a positive response being reset. When two conditions are satisfied, that is, the sub-function of EcuReset $11 is a reprogramming-related functions (Reprogramming 0x03) and the ECU for detection provides a positive response after being reset, the ECU for detection enters the reprogramming mode.

The ECU for detection is in the message transmission incapacitated state after entering the reprogramming mode. In other words, according to an embodiment of the disclosure, the reprogramming detector 140 may determine that the ECU for detection is in the message transmission incapacitated state when two conditions are satisfied, that is, 1) the sub function of EcuReset $11 is a reprogramming related function, and 2) the ECU for detection provides a positive response after being reset. Alternatively, according to another embodiment of the disclosure, the reprogramming detector 140 may determine that the ECU for detection is in the message transmission incapacitated state when the sub function of EcuReset $11 is a reprogramming-related function as a minimum triggering condition, and additionally, the reprogramming detector 140 may confirm the message transmission incapacitated state based on a positive response/a negative response after being reset depending on the manufacturer of the ECU for detection.

Also, the ECU for detection may be transit to the normal state when a Request Transfer Exit $37 request is received in the reprogramming mode and returns to the normal message transmission state. Therefore, when the reprogramming detector 140 detects a Request Transfer Exit $37 request, the reprogramming detector 140 may transit the state of the ECU for detection from the message transmission incapacitated state to the normal message transmission state. In this case, CAN messages corresponding to the ECU for detection detected by the target ECU may be determined as normal CAN messages.

Meanwhile, there may be a case in which power is removed only for an ECU for detection during a reprogramming mode of the ECU for detection. In this case, the ECU for detection is able to transmit a normal CAN message after being reset, and thus the ECU state monitoring unit 101 may receive both a normal CAN message and an abnormal CAN message. In other words, since a normal CAN message and an abnormal CAN message conflicts with each other, a hacker's attack may be detected.

Next, the temporary incapacity detector 150 detects a diagnostic service request that makes the ECU for detection temporarily in the message transmission incapacitated state and detects a case where a service that performs a function related to disabledNormalMessageTransmission for the purpose of a diagnostic service is triggered. In other words, the temporary incapacity detector 150 may detect a diagnostic service request that performs a disableNormalMessageTransmission related function specified in the UDS specification.

The disableNormalMessageTransmission service is a sub function of Communication Control $28 in the UDS specification, may only be operated in an extended mode, and has a limited duration. Typically, the disableNormalMessageTransmission service may last for about 3 seconds, so it is necessary to transmit disableNormalMessageTransmission $28 continuously to maintain the disableNormalMessageTransmission state. Therefore, the temporary incapacity detector 150 may determine that the ECU for detection is temporarily in the message transmission incapacitated state when the disableNormalMessageTransmission $28 request is successively present at an interval less than or equal to a pre-set time interval (e.g., every three seconds).

Next, as described above, when CAN messages having a CAN ID corresponding to the ECU for detection are periodically received although the reprogramming detector 140 or the temporary incapacity detector 150 has determined that the ECU for detection is in the message transmission incapacitated state, the abnormal message determiner 160 may determine the CAN messages as abnormal CAN messages. In other words, when CAN messages corresponding to the ECU for detection are received although the ECU for detection is in the message transmission incapacitated state and is unable to normally transmit CAN messages, the corresponding CAN messages may be determined as abnormal CAN messages that mimic normal CAN messages due to a hacking attack and transmitted by an abnormal ECU.

Next, the detection score learner 170 may provide a detection learning algorithm that the abnormal message determiner 160 may use in case of determining whether a received CAN message is normal or abnormal.

Here, it is difficult of the abnormal message determiner 160 as described above to determine a corresponding CAN message as an abnormal message every time a CAN message corresponding to an ECU for detection is received. This is because period of receiving messages may be incorrect or messages may be erroneously transmitted due to noise even in a normal case, due to characteristics of an embedded environment. Therefore, the disclosure may utilize a detection score learning algorithm capable of detecting abnormal messages more accurately.

In detail, the detection score learner 170 may increase a detection score by a pre-set value when CAN message corresponding to the ECU for detection is received and decrease the detection score by a pre-set value when a CAN message corresponding to the ECU for detection is not received within a pre-set time, when the ECU for detection is in the message transmission incapacitated state, Using the calculated detection score, the abnormal message determiner 160 may determine that a CAN message corresponding to the ECU for detection is an abnormal message when the detection score is equal to or greater than a pre-set reference value.

The disclosure has been described above based on the bypass attack detector 100 in the CAN controller 30. Meanwhile, in another embodiment of the disclosure, the bypass attack detector 100 may be provided outside the CAN controller 30 or a method related to the operation of the bypass attack detector 100 may be implemented as an embodiment. In other words, according to another embodiment of the disclosure, the operations of the bypass attack detector 100 described herein may be implemented as a method including time series operations, wherein the subject of the method may not necessarily be the CAN controller 30. For example, a method of performing the operations described in FIG. 15 may be an embodiment of the disclosure, wherein the method of performing the operations may be performed by a device other than the CAN controller 30.

At this time, the subject performing the method according to another embodiment of the disclosure may be a processor embedded in a target ECU, wherein instructions stored in the processor may control the target ECU and the CAN controller 30 of the target ECU according to embodiments of the disclosure. Therefore, the case may be applied to electronic ECUs in various fields using a CAN communication, such as construction heavy equipment and agricultural tractors, as well as automobiles. Alternatively, the subject performing the method according to another embodiment of the disclosure may be an auxiliary ECU connected to the target ECU in the form of a H/W type connector. In this case, the auxiliary ECU needs only to be connected to the target ECU, and thus no H/W or S/W modification is necessary. Alternatively, the subject performing the method according to another embodiment of the disclosure may be a semiconductor device embedded in the CAN controller 30 of the target ECU, and a S/W of the semiconductor device may be designed to perform the method of the disclosure. Alternatively, the subject performing the method according to another embodiment of the disclosure may be a security gateway connected to a CAN bus. In this case, the security gateway may determine abnormality of all CAN messages of a connected CAN bus network without being connected to individual ECUs.

Figure 15:
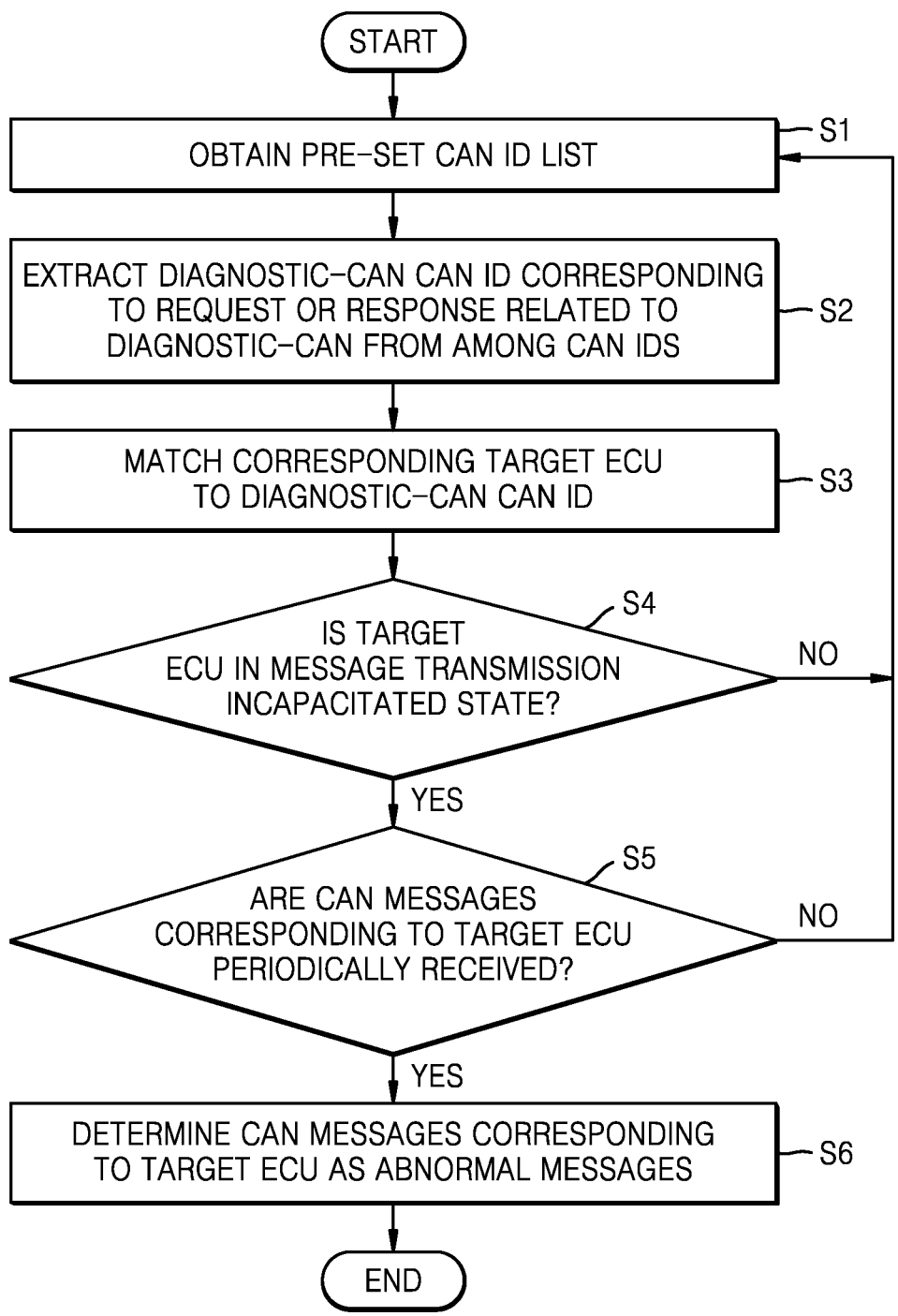
FIG. 15 is a flowchart showing a CAN communication based bypass attack detection method according to an embodiment of the disclosure in the chronological order.

FIG. 15 is a flowchart showing a CAN communication based bypass attack detection method according to an embodiment of the disclosure in the chronological order. Each operation of FIG. 15 according to an embodiment of the disclosure may be performed by the bypass attack detector 100.

Referring to FIG. 15, first, a pre-set CAN ID list is obtained (operation S1).

Next, a diagnostic-CAN CAN ID corresponding to a diagnostic-CAN related request or response is extracted from CAN IDs corresponding to one or more CAN messages received from a CAN bus (operation S2).

Next, a corresponding ECU for detection is matched to the diagnostic-CAN CAN ID (operation S3).

Next, it is determined whether the ECU for detection is incapable in the message transmission incapacitated state. When the ECU for detection is in the normal message transmission state, the method returns to operation S1. When the ECU for detection is in the message transmission incapacitated state, the method proceeds to operation S5 (operation S4).

Next, when ECU for detection is in the message transmission incapacitated state, it is determined whether CAN messages corresponding to the ECU for detection are periodically received. When CAN messages are not received, the method returns to operation S1. When CAN messages are received, the method proceeds to operation S6 (operation S5).

Finally, CAN messages corresponding to the ECU for detection are determined as abnormal messages (operation S6).

Figure 16:
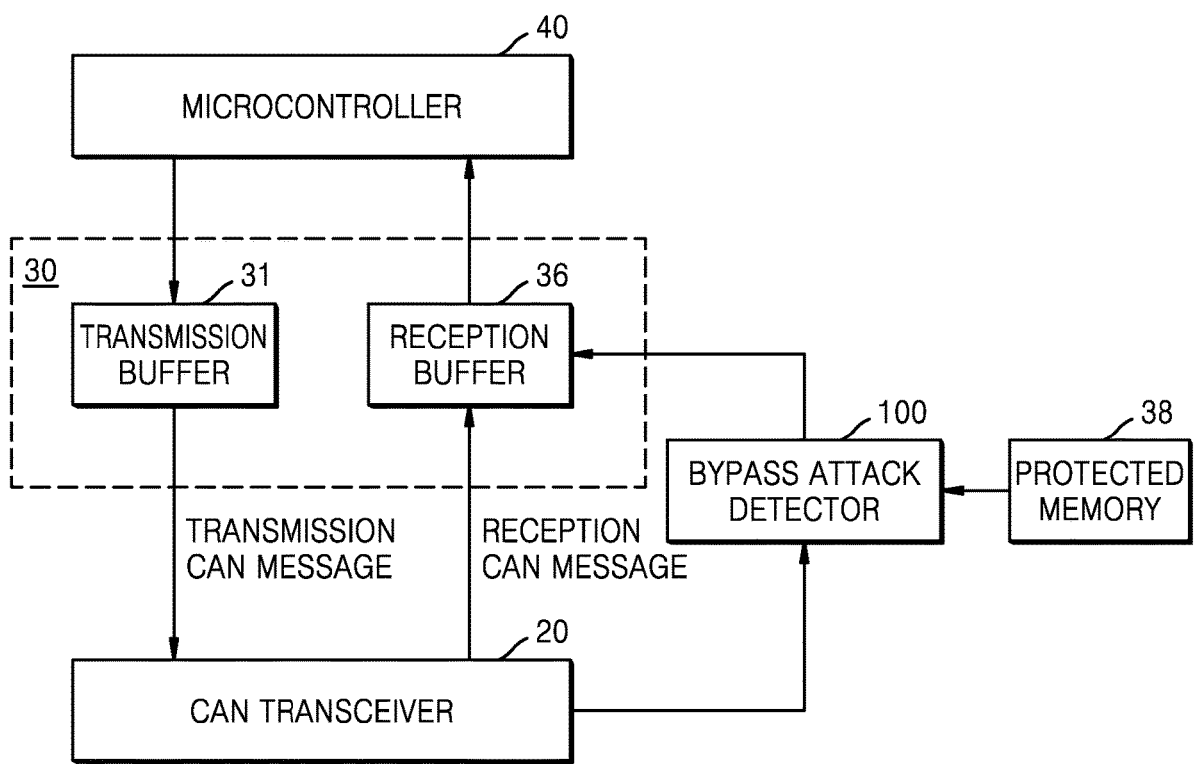
FIG. 16 is a diagram showing a case in which a bypass attack detector is located outside a CAN controller according to an embodiment of the disclosure.

FIG. 16 is a diagram showing a case in which a bypass attack detector is located outside a CAN controller 30 according to an embodiment of the disclosure.

Referring to FIG. 16, the bypass attack detector 100 is located outside the CAN controller 30, and the bypass attack detector 100 may obtain a reception CAN message from the CAN transceiver 20, determine whether the CAN message is an abnormal message, and provides a result of the determination to the reception buffer 36. Here, the bypass attack detector 100 may include a processor in which instructions for controlling a target ECU according to the method of the disclosure are stored.

Particular implementations described in the disclosure are merely embodiments and do not limit the scope of the disclosure in any way. For brevity of description, descriptions of conventional electronic configurations, control systems, software, and other functional aspects of the systems may be omitted. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Also, unless specifically mentioned as "essential", "important", components may not be necessary components for the application of the disclosure.

In the specification (particularly in the claims) of the disclosure, the use of the term "said" and similar indicating terminology may correspond to both the singular and the plural. Also, in the disclosure, when the range is described, it includes the disclosure to which the individual values belonging to the range are applied, and (if there is no description thereof) it is considered that each individual value constituting the range is described in the detailed description of the disclosure. Finally, if there is no explicit order or contrary to the steps constituting the method according to the disclosure, the steps may be carried out in a suitable order. The disclosure is not necessarily limited to the described order of the above steps. The use of all examples or exemplary terms (e.g., etc.) in the disclosure is merely for the purpose of describing the disclosure in detail, and the scope of the disclosure is not limited by the above examples or exemplary terms unless defined by the claims. Also, one of ordinary skill in the art appreciates that various modifications, combinations and changes can be made in accordance with design conditions and factors within the scope of the appended claims or their equivalents.

Embodiments according to the disclosure described above can be implemented in the form of program instructions that can be executed by various computer components and recorded in a computer-readable recording medium. The computer-readable recording medium may include program instructions, data files, data structures, etc. alone or in combination. Program instructions recorded on the computer-readable recording medium may be specially designed and configured for the disclosure, or may be known and available to those skilled in the computer software arts. Examples of computer-readable recording media include magnetic media such as hard disks, floppy disks and magnetic tape, optical recording media such as CD-ROMs and DVDs, and magneto-optical media such as floptical disks. medium) and hardware devices specifically configured to store and execute program instructions, such as ROM, RAM, flash memory, and the like. Examples of program commands include machine language code such as code generated by a compiler, as well as high-level language code that may be executed by a computer using an interpreter or the like. Hardware devices may be modified with one or more software modules to perform the processing according to the disclosure, and vice versa.

Although the disclosure has been described by specific matters such as specific components and limited embodiments and drawings, this is only provided to help a more general understanding of the disclosure, and the disclosure is not limited to the above embodiments. Those skilled in the art may make various modifications and changes from this description.

Therefore, the spirit of the disclosure should not be limited to the above-described embodiments, and the scope of the spirit of the disclosure is defined not only in the claims below, but also in the ranges equivalent to or equivalent to the claims.

The invention claimed is:

1. A controller area network ("CAN") communication based abnormal message detection method comprising:
   obtaining, by a computer, a plurality of reception times of a plurality of reception messages;
   performing, by the computer, a period calculation for each of the plurality of reception messages, wherein performing the period calculation includes comparing a difference between each of the plurality of reception times having a given message identifier (ID) and a corresponding reference period of the given message identifier (ID);
   determining, by the computer and for each reception message from among the plurality of reception messages, a reception message is an abnormal message when the difference between a corresponding set of reception times from among the plurality of reception times is smaller than the corresponding reference period;
   correcting, by the computer, a detection score based on the period calculation by:
      increasing the detection score by a pre-set value when the difference between the corresponding set of reception times is smaller than the corresponding reference period; and
      decreasing the detection score by the pre-set value when the difference between the corresponding set of reception times is greater than the corresponding reference period;
   determining, by the computer and for each reception message from the plurality of reception messages, the reception message is a normal message when the difference between the corresponding set of reception times is greater than the corresponding reference period; and
   blocking, by the computer, the reception message in response to the determination that the reception message is the abnormal message and when the detection score is equal to or greater than a certain value.

2. The method of claim 1, wherein obtaining the plurality of reception times of is measured as a microcontroller generates an interrupt signal or based on a measurement obtained by a CAN controller.

3. The method of claim 1, wherein:
   comparing the difference between the corresponding set of reception times further comprises comparing at least three most recently received reception messages from among the plurality of reception messages having the given message identifier (ID) with the corresponding reference period of the given message identifier (ID), and
   determining the reception message is the abnormal message further comprises determining at least one reception message from among the at least three most recently received reception messages is the abnormal message when the difference between a first reception time and a third reception time from among the at least three most recently received reception messages is smaller than the corresponding reference period of the given message identifier (ID).

4. The method of claim 1 further comprising performing the period calculation every time the reception message is received.

5. The method of claim 4, wherein at least one of the corresponding reference period and the detection score of the given message identifier (ID) is stored in a protected memory, wherein the protected memory is a non-volatile memory, and wherein the non-volatile memory includes one of a read only memory (ROM) and a flash memory.

6. A controller area network (CAN) communication based abnormal message detection system comprising:
   a CAN controller comprising a processor and a non-volatile memory, wherein the CAN controller comprises:
      a reception time measuring unit configured to obtain a plurality of reception times of a plurality of reception messages;
      a reception filter configured to perform a period calculation for each of the plurality of reception messages, wherein performing the period calculation includes comparing a difference between a corresponding set of reception times from among the plurality of reception times of the plurality of reception messages having a given message ID and a reference period of the given message identifier (ID);
      a detection score unit configured to correct a detection score based on the period calculation by:
         increasing the detection score by a pre-set value when the difference between the corresponding set of reception times is smaller than the corresponding reference period, and
         decreasing the detection score by the pre-set value when the difference between the corresponding set of reception times is greater than the corresponding reference period;
      an abnormal message detector configured to determine, for each reception message from among the plurality of reception messages:
         the reception message is an abnormal message when the difference between the reception times is smaller than the corresponding reference period, and
         the reception message is a normal message when the difference between the corresponding set of reception times is greater than the corresponding reference period and when the detection score is equal to or greater than a certain value.

7. A controller area network ("CAN") communication based bypass attack detection method comprising:
   obtaining, by a computer, controller area network identifiers ("CAN IDs") from one or more CAN messages received from a CAN bus and generating a CAN ID list;
   extracting, by the computer, a diagnostic-CAN CAN ID corresponding to a request or a response related to a diagnostic-CAN from among the CAN IDs;
   matching, by the computer, an electronic controller ("ECU") for detection to the diagnostic-CAN CAN ID;

determining, by the computer, whether a state of the ECU for detection is a normal message transmission state or a message transmission incapacitated state;

determining, by the computer, CAN messages corresponding to the ECU for detection as abnormal messages when the ECU for detection is in the message transmission incapacitated state and CAN messages corresponding to the ECU for detection are periodically received;

increasing a detection score by a pre-set value when the CAN message corresponding to the ECU for detection is received;

decreasing the detection score by the pre-set value when the CAN message corresponding to the ECU for detection is not received within a pre-set time when the ECU for detection is in the message transmission incapacitated state; and determining, when the detection score is equal to or greater than a reference value, the CAN message corresponding to the ECU for detection is the abnormal message, wherein determining whether the state of the ECU for detection is in the normal message transmission state or the message transmission incapacitated state further comprises:

detecting that the ECU for detection enters a reprogramming mode and is in the message transmission incapacitated state; and detecting that the ECU for detection is temporarily in the message transmission incapacitated state.

8. The method of claim 7 further comprising determining that the ECU for detection enters the reprogramming mode and is in the message transmission incapacitated state based on detection of a reprogramming-related ECU reset request with respect to the ECU for detection.

9. The method of claim 7 further comprising determining the ECU for detection is temporarily in the message transmission incapacitated state in response to detecting message transmission disabling requests for the ECU for detection.

10. The method of claim 7, wherein the state of the ECU for detection is stored in a non-volatile memory.

* * * * *